United States Patent
Chen et al.

(10) Patent No.: US 11,503,149 B2
(45) Date of Patent: Nov. 15, 2022

(54) DEVICE-CLOUD COLLABORATION METHOD, PLATFORM, AND APPARATUS

(71) Applicant: Huawei Technologies Co., Ltd., Shenzhen (CN)

(72) Inventors: Jianjun Chen, Shenzhen (CN); Ye Liu, Shenzhen (CN); Chunfeng Pei, Shenzhen (CN); Wengang Tian, Shenzhen (CN); Yiyin Wang, Shenzhen (CN); Haidong Song, Shenzhen (CN); Wenjie Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/039,082

(22) Filed: Sep. 30, 2020

(65) Prior Publication Data

US 2021/0058506 A1    Feb. 25, 2021

Related U.S. Application Data

(63) Continuation of application No. PCT/CN2019/079859, filed on Mar. 27, 2019.

(30) Foreign Application Priority Data

Apr. 4, 2018    (CN) .......................... 201810298507.8

(51) Int. Cl.
*H04M 1/72457* (2021.01)
*H04W 4/029* (2018.01)
(Continued)

(52) U.S. Cl.
CPC ........ *H04M 1/72457* (2021.01); *H04L 67/52* (2022.05); *H04M 1/72406* (2021.01); *H04W 4/029* (2018.02)

(58) Field of Classification Search
CPC ............ G01C 21/3685; G01C 21/3492; G01C 21/3667; G01C 21/3815; G01C 21/3697;
(Continued)

(56) References Cited

U.S. PATENT DOCUMENTS

| 2010/0041378 A1* | 2/2010 | Aceves | H04W 4/029 |
| | | | 455/414.1 |
| 2012/0095979 A1* | 4/2012 | Aftab | H04W 4/023 |
| | | | 707/E17.084 |

(Continued)

FOREIGN PATENT DOCUMENTS

| CN | 103793836 A | 5/2014 |
| CN | 104620609 A | 5/2015 |

(Continued)

*Primary Examiner* — Kwasi Karikari
(74) *Attorney, Agent, or Firm* — Conley Rose, P.C.

(57) ABSTRACT

A device-cloud collaboration method, platform, and apparatus, where the device-cloud collaboration method includes: obtaining current spatial information of each target terminal; tracking a spatial information change of each target terminal, to obtain a spatial information change status of each target terminal; and determining, based on spatial information-based arbitration conditions preset for different target mobile applications and the spatial information change status of the target terminal corresponding to the different target mobile applications, whether to trigger subsequent operations related to the different target mobile applications. The device-cloud platform blocks a change in which the user is not interested through arbitration of a spatial information change of the user, and provides an appropriate spatial information change to a mobile application, or triggers a subsequent operation of the mobile application.

20 Claims, 15 Drawing Sheets

(51) Int. Cl.
*H04M 1/72406* (2021.01)
*H04L 67/52* (2022.01)

(58) Field of Classification Search
CPC .............. G01C 21/343; G01C 21/3614; G01C 21/3617; G01C 21/3811; H04N 21/4622; H04N 21/431; H04N 21/2187; H04N 21/23614; H04W 4/40; H04W 4/029; H04W 4/021; H04W 4/027; H04W 72/02; H04W 72/042; H04W 4/02; H04W 64/00; H04W 72/085; H04W 48/04; H04W 4/33; H04W 52/282; H04W 76/40
See application file for complete search history.

(56) References Cited

U.S. PATENT DOCUMENTS

| | | | |
|---|---|---|---|
| 2014/0066101 A1* | 3/2014 | Lyman | H04L 67/34 455/456.3 |
| 2014/0122215 A1 | 5/2014 | Chalk | |
| 2014/0351728 A1 | 11/2014 | Seo et al. | |
| 2015/0244797 A1 | 8/2015 | Edwall et al. | |
| 2015/0281889 A1* | 10/2015 | Menendez | H04L 29/08657 455/456.1 |
| 2016/0249177 A1 | 8/2016 | Sandel et al. | |

FOREIGN PATENT DOCUMENTS

| | | |
|---|---|---|
| CN | 105357636 A | 2/2016 |
| CN | 105376257 A | 3/2016 |
| CN | 106131300 A | 11/2016 |
| CN | 106781434 A | 5/2017 |
| WO | 2015170363 A1 | 11/2015 |

\* cited by examiner

DEVICE-CLOUD COLLABORATION METHOD, PLATFORM, AND APPARATUS

CROSS-REFERENCE TO RELATED APPLICATIONS

This application is a continuation of International Patent Application No. PCT/CN2019/079859, filed on Mar. 27, 2019, which claims priority to Chinese Patent Application No. 201810298507.8, filed on Apr. 4, 2018. The disclosures of the aforementioned applications are hereby incorporated by reference in their entireties.

TECHNICAL FIELD

The present disclosure relates to the communications field, and in particular, to a device-cloud collaboration method, platform, and apparatus.

BACKGROUND

Mobile applications based on spatial data are becoming popular in recent years. A new sharing platform such as Uber, DiDi Chuxing, or bicycle sharing, or a food/restaurant/activity recommendation application such as yelp, or Dianping, or the most popular game lately Pokémon Go, is closely bound to real-time spatial information of a user. Pokémon Go or another similar mobile device game mainly detects a geographical location and an activity status of a user and generates a virtual scenario in real time for consumption of the user. For the foregoing applications, real-time location information of the user needs to be learned, and a change in the foregoing information needs to be accurately tracked, to collect and provide real-time and accurate latest location information that is required in the applications. Alternatively, a cloud server is continuously queried, and a massive spatial information database on the cloud is queried, to push corresponding information to a mobile device database.

To support these typical mobile application scenarios described above, a common method in the industry is to customize specific data collaboration logic between a mobile device and a cloud for an application. The conventional data collaboration of the mobile application is usually based on a general three-layer architecture of distributed data processing. An application mobile device exchanges data with a server/cloud through a server application programming interface (API). The server/cloud exchanges data with a database through a database API, and obtains and processes data in the cloud database. Specific design needs to be performed for mobile applications based on different application scenarios to meet different requirements of distributed data consistency. This makes development of the mobile application quite complex and error-prone, and cannot well meet diversified requirements of the mobile application for spatial information.

SUMMARY

To better meet a diversified requirement of a mobile application for spatial information, embodiments of the present disclosure provide a device-cloud collaboration method and apparatus, and a system, a device, and an apparatus, such that a device-cloud platform can natively support spatial data of a user.

According to an aspect of the present disclosure, a device-cloud collaboration method is provided, where the method includes: obtaining, by a cloud platform, current spatial information of each target terminal, where the spatial information is used to indicate a location of the target terminal, the target terminal is communicatively connected to the cloud platform, a target mobile application is installed on the target terminal, and the target mobile application needs to obtain the spatial information of the target terminal; tracking a spatial information change of each target terminal, to obtain a spatial information change status of each target terminal; and determining, based on spatial information-based arbitration conditions preset for different target mobile applications and the spatial information change status of the target terminal corresponding to the different target mobile applications, whether to trigger subsequent operations related to the different target mobile applications.

According to another aspect of the present disclosure, a device-cloud collaboration platform is provided. The platform includes: a cloud platform and a plurality of target terminals.

Each of the plurality of target terminals is configured to obtain respective current spatial information, the spatial information is used to indicate a location of the target terminal, the target terminal is communicatively connected to the cloud platform, a target mobile application is installed on the target terminal, and the target mobile application needs to obtain the spatial information of the target terminal.

The cloud platform is configured to: track a spatial information change of each target terminal, to obtain a spatial information change status of each target terminal; and determine, based on spatial information-based arbitration conditions preset for different target mobile applications and the spatial information change status of the target terminal corresponding to the different target mobile applications, whether to trigger subsequent operations related to the different target mobile applications.

According to another aspect of the present disclosure, a cloud platform is provided, where the cloud platform includes: a spatial information obtaining module configured to obtain current spatial information of each target terminal, where the spatial information is used to indicate a location of the target terminal, the target terminal is communicatively connected to the cloud platform, a target mobile application is installed on the target terminal, and the target mobile application needs to obtain the spatial information of the target terminal; a spatial information change tracking module configured to track the current spatial information of each target terminal obtained by the spatial information obtaining module, to obtain a spatial information change status of each target terminal; and a spatial information change arbitration module configured to determine, based on spatial information-based arbitration conditions preset for different target mobile applications and the spatial information change status, obtained by the spatial information change tracking module, of the target terminal corresponding to the different target mobile applications, whether to trigger subsequent operations related to the different target mobile applications.

According to another aspect of the present disclosure, a terminal is provided, where the terminal includes: a spatial information obtaining module configured to obtain current spatial information of the terminal, where the spatial information is used to indicate a location of the terminal, a target mobile application is installed on the terminal, and the target mobile application needs to obtain the spatial information of the terminal; a spatial information change tracking module configured to track the current spatial information of the terminal obtained by the spatial information obtaining module, to obtain a spatial information change status of the terminal; and a spatial information change arbitration module configured to determine, based on spatial information-based arbitration conditions preset for different target mobile applications and the spatial information change status of the terminal, whether to trigger subsequent operations related to the different target mobile applications.

Optionally, the terminal may further include a continuous query module.

The spatial information change arbitration module is configured to determine, based on the spatial information-based arbitration conditions preset for the different target mobile applications and the spatial information change status of the terminal obtained by the spatial information change tracking module, whether to trigger the continuous query module. The continuous query module is configured to: after being triggered by the spatial information change arbitration module, use the spatial information of the terminal as a variable query condition; and when a query condition change meets a preset condition, trigger a query of a database for related information of the target mobile application; and push a query result to the terminal.

According to another aspect of the present disclosure, a terminal is provided, where the terminal includes: a spatial information obtaining module configured to obtain current spatial information of the terminal, where the spatial information is used to indicate a location of the terminal, a target mobile application is installed on the terminal, and the target mobile application needs to obtain the spatial information of the terminal; a spatial information synchronization module configured to synchronize the obtained spatial information to a cloud platform; a spatial information change tracking module configured to track the current spatial information of the terminal obtained by the spatial information obtaining module, to obtain a spatial information change status of the terminal; and a spatial information change arbitration module configured to determine, based on spatial information-based arbitration conditions preset for different target mobile applications and the spatial information change status of the terminal, whether to trigger, on the terminal or the cloud platform, subsequent operations related to the different target mobile applications.

Optionally, the spatial information change arbitration module includes a determining unit and a trigger unit.

The determining unit is configured to determine, for each target mobile application, whether the spatial information change status of the terminal meets the spatial information-based arbitration condition preset for the target mobile application.

The trigger unit is configured to: if the determining unit determines that the arbitration condition is met, trigger a subsequent operation related to the target mobile application; or if the determining unit determines that the arbitration condition is not met, skip triggering a subsequent operation related to the target mobile application.

Optionally, the terminal or the cloud platform further includes a push module, and the spatial information change arbitration module is configured to determine, based on the spatial information-based arbitration conditions preset for the different target mobile applications and the spatial information change status of the terminal obtained by the spatial information change tracking module, whether to trigger the push module.

The push module is configured such that after being triggered by the spatial information change arbitration module, the push module notifies the target mobile application of the spatial information change status of the terminal.

Optionally, the terminal or the cloud platform further includes a permission management module.

The spatial information change arbitration module is configured to determine, based on the spatial information-based arbitration conditions preset for the different target mobile applications and the spatial information change status of the terminal obtained by the spatial information change tracking module, whether to trigger the permission management module. The permission management module is configured such that after being triggered by the spatial information change arbitration module, the permission management module determines, based on preset data access permission, whether to allow the terminal to perform an operation on or to access data for which the preset permission is granted.

Optionally, the terminal or the cloud platform may further include a continuous query module.

The spatial information change arbitration module is configured to determine, based on the spatial information-based arbitration conditions preset for the different target mobile applications and the spatial information change status of the terminal obtained by the spatial information change tracking module, whether to trigger the continuous query module. The continuous query module is configured to: after being triggered by the spatial information change arbitration module, use the spatial information of the terminal as a variable query condition, and when a query condition change meets a preset condition, trigger a query of a database for related information of the target mobile application; and push a query result to the terminal.

According to another aspect of the present disclosure, a cloud platform is provided, where the cloud platform includes: a processor and a readable storage medium, where the readable storage medium is configured to store a program. The processor is configured to execute the program to perform the following steps: obtaining current spatial information of each target terminal, where the spatial information is used to indicate a location of the target terminal, the target terminal is communicatively connected to the cloud platform, a target mobile application is installed on the target terminal, and the target mobile application needs to obtain the spatial information of the target terminal; tracking a spatial information change of each target terminal, to obtain a spatial information change status of each target terminal; and determining, based on spatial information-based arbitration conditions preset for different target mobile applications and the spatial information change status of the target terminal corresponding to the different target mobile applications, whether to trigger subsequent operations related to the different target mobile applications.

Optionally, on the cloud platform, the determining, based on spatial information-based arbitration conditions preset for different target mobile applications and the spatial information change status of the target terminal corresponding to the different target mobile applications, whether to trigger subsequent operations related to the different target mobile applications includes: determining, for each target mobile application, whether the spatial information change status of the target terminal corresponding to the target mobile application meets the spatial information based arbitration condition preset for the target mobile application; and if the arbitration condition is met, triggering a subsequent operation related to the target mobile application; or if the arbitration condition is not met, skipping triggering a subsequent operation related to the target mobile application.

Optionally, on the cloud platform, the tracking a spatial information change of each target terminal, to obtain a spatial information change status of each target terminal includes: comparing the current spatial information of each target terminal with spatial information of each target terminal obtained a preset time interval ago, to obtain a spatial information change increment of each target terminal.

The determining, for each target mobile application, whether the spatial information change status of the target terminal corresponding to the target mobile application meets the spatial information-based arbitration condition preset for the target mobile application includes: determining, for each target mobile application, whether the spatial information change increment of the target terminal corresponding to the target mobile application is greater than or equal to a spatial information change threshold preset for the target mobile application.

Optionally, in the processor program, the tracking a spatial information change of each target terminal, to obtain a spatial information change status of each target terminal includes: tracking a current spatial information change of each target terminal, to obtain a location area of each target terminal.

The determining, for each target mobile application, whether the spatial information change status of the target terminal corresponding to the target mobile application meets the spatial information-based arbitration condition preset for the target mobile application includes: determining, for each target mobile application, whether the location area of the target terminal corresponding to the target mobile application is a location area preset for the target mobile application.

Optionally, in the processor program, the triggering subsequent operations related to the different target mobile applications includes: notifying the target mobile application of the spatial information change status of the target terminal corresponding to the target mobile application.

Optionally, in the processor program, the triggering subsequent operations related to the different target mobile applications includes: using the spatial information of the target terminal corresponding to the target mobile application as a variable query condition, and when a query condition change meets a preset condition, triggering a query for related information of the target mobile application; and pushing a query result to the mobile application.

Optionally, in the processor program, the triggering subsequent operations related to the different target mobile applications includes: determining, based on preset data access permission, whether to allow the target terminal corresponding to the target mobile application to perform an operation on or to access data for which the preset permission is granted.

According to another aspect of the present disclosure, a device-cloud collaboration apparatus is provided, where the apparatus includes: a processor and a readable storage medium, where the readable storage medium is configured to store a program. The processor is configured to execute the program to perform the following steps: obtaining current spatial information of the apparatus, where the spatial information is used to indicate a location of the apparatus, the apparatus is communicatively connected to the cloud platform, a target mobile application is installed on the apparatus, and the target mobile application needs to obtain the spatial information of the apparatus; tracking the current spatial information of the apparatus, to obtain a spatial information change status of the apparatus; and determining, based on spatial information-based arbitration conditions preset for different target mobile applications and the spatial information change status of the apparatus, whether to trigger subsequent operations related to the different target mobile applications.

According to another aspect of the present disclosure, a device-cloud collaboration apparatus is provided, where the apparatus includes: a processor and a readable storage medium, where the readable storage medium is configured to store a program. The processor is configured to execute the program to perform the following steps: obtaining current spatial information of the apparatus, where the spatial information is used to indicate a location of the apparatus, the apparatus is communicatively connected to the cloud platform and synchronizes the spatial information to the cloud platform, a target mobile application is installed on the apparatus, and the target mobile application needs to obtain the spatial information of the apparatus; tracking the current spatial information of the apparatus, to obtain a spatial information change status of the apparatus; and determining, based on spatial information-based arbitration conditions preset for different target mobile applications and the spatial information change status of the apparatus, whether to trigger, on the apparatus or the cloud platform, subsequent operations related to the different target mobile applications.

Optionally, in the processor program, the determining, based on spatial information based arbitration conditions preset for different target mobile applications and the spatial information change status of the apparatus, whether to trigger subsequent operations related to the different target mobile applications includes: determining, for each target mobile application, whether the spatial information change status of the terminal meets the spatial information-based arbitration condition preset for the target mobile application; and if the arbitration condition is met, triggering a subsequent operation related to the target mobile application; or if the arbitration condition is not met, skipping triggering a subsequent operation related to the target mobile application.

Optionally, in the processor program, the tracking a spatial information change of the apparatus, to obtain a spatial information change status of the apparatus includes: comparing the current spatial information of the apparatus with spatial information of the apparatus obtained a preset time interval ago, to obtain a spatial information change increment of the apparatus.

The determining, for each target mobile application, whether the spatial information change status of the apparatus meets the spatial information-based arbitration condition preset for the target mobile application includes: determining, for each target mobile application, whether the spatial information change increment of the apparatus is greater than or equal to a spatial information change threshold preset for the target mobile application.

Optionally, in the processor program, the tracking a spatial information change of the apparatus, to obtain a spatial information change status of the apparatus includes: tracking a current spatial information change of the apparatus, to obtain a location area of the apparatus.

The determining, for each target mobile application, whether the spatial information change status of the apparatus meets the spatial information-based arbitration condition preset for the target mobile application includes: determining, for each target mobile application, whether the location area of the apparatus is a location area preset for the target mobile application.

Optionally, in the processor program, the triggering subsequent operations related to the different target mobile applications includes: notifying the target mobile application of the spatial information change status of the apparatus.

Optionally, in the processor program, the triggering subsequent operations related to the different target mobile applications includes: using the spatial information of the apparatus as a variable query condition; when a query condition change meets a preset condition, triggering a query for related information of the target mobile application; and pushing a query result to the mobile application.

Optionally, in the processor program, the triggering subsequent operations related to the different target mobile applications includes determining, based on preset data access permission, whether to allow the apparatus to perform an operation on or to access data for which the preset permission is granted.

According to another aspect of the present disclosure, a device-cloud collaboration method is further provided, where the method includes: obtaining, by a cloud platform, time information and current spatial information of each target terminal, where the time information indicates a current system time of the target terminal, the spatial information indicates a location of the target terminal, the target terminal is communicatively connected to the cloud platform, a target mobile application is installed on the target terminal, and the target mobile application needs to obtain the spatial information of the target terminal; tracking a spatial information change of each target terminal, to obtain a spatial information change status of each target terminal; and determining, based on spatial information-based arbitration conditions and time information based arbitration conditions preset for different target mobile applications, and the spatial information change status and the time information of the target terminal corresponding to the different target mobile applications, whether to trigger subsequent operations related to the different target mobile applications.

Optionally, the determining, based on spatial information-based arbitration conditions and time information-based arbitration conditions preset for different target mobile applications, and the spatial information change status and the time information of the target terminal corresponding to the different target mobile applications, whether to trigger subsequent operations related to the different target mobile applications includes: determining, for each target mobile application, whether the spatial information change status of the target terminal corresponding to the target mobile application meets the spatial information-based arbitration condition preset for the target mobile application; determining, for each target mobile application, whether the time information of the target terminal corresponding to the target mobile application is within a preset time range; and if the two conditions are both met, triggering a subsequent operation related to the target mobile application; or if either of the two conditions is not met, skipping triggering a subsequent operation related to the target mobile application.

Optionally, the tracking a spatial information change of each target terminal, to obtain a spatial information change status of each target terminal includes: comparing the current spatial information of each target terminal with spatial information of each target terminal obtained a preset time interval ago, to obtain a spatial information change increment of each target terminal.

The determining, for each target mobile application, whether the spatial information change status of the target terminal corresponding to the target mobile application meets the spatial information-based arbitration condition preset for the target mobile application includes: determining, for each target mobile application, whether the spatial information change increment of the target terminal corresponding to the target mobile application is greater than or equal to a spatial information change threshold preset for the target mobile application.

Optionally, the tracking a spatial information change of each target terminal, to obtain a spatial information change status of each target terminal includes: tracking a current spatial information change of the target terminal, to obtain a location area of the target terminal.

The determining, for each target mobile application, whether the spatial information change status of the target terminal corresponding to the target mobile application meets the spatial information-based arbitration condition preset for the target mobile application includes: determining, for each target mobile application, whether the location area of the target terminal corresponding to the target mobile application is a location area preset for the target mobile application.

Optionally, the triggering subsequent operations related to the different target mobile applications includes: notifying the target mobile application of the spatial information change status of the target terminal corresponding to the target mobile application.

Optionally, the triggering subsequent operations related to the different target mobile applications includes: using the spatial information of the target terminal corresponding to the target mobile application as a variable query condition; when a query condition change meets a preset condition, triggering a query for related information of the target mobile application; and pushing a query result to the target terminal corresponding to the target mobile application.

Optionally, the triggering subsequent operations related to the different target mobile applications includes: determining, based on preset data access permission, whether to allow the target terminal corresponding to the target mobile application to perform an operation on or to access data for which the preset permission is granted.

According to another aspect of the present disclosure, a device-cloud collaboration platform is further provided. The platform includes: a cloud platform and a plurality of target terminals.

The plurality of target terminals are configured to: obtain respective current spatial information; and synchronize the obtained spatial information to the cloud platform, where the spatial information is used to indicate a location of the target terminal, the target terminal is communicatively connected to the cloud platform, a target mobile application is installed on the target terminal, and the target mobile application needs to obtain the spatial information of the target terminal.

The cloud platform is configured to: obtain time information and obtain the spatial information from each target terminal, where the time information indicates a current system time of the target terminal; track a spatial information change of each target terminal, to obtain a change status of the spatial information of each target terminal; and determine, based on spatial information-based arbitration conditions and time information-based arbitration conditions preset for different target mobile applications, and the spatial information change status and the time information of the target terminal corresponding to the different target mobile applications, whether to trigger subsequent operations related to the different target mobile applications.

Optionally, that the cloud platform determines, based on spatial information-based arbitration conditions and time information-based arbitration conditions preset for different target mobile applications, and the spatial information change status and the time information of the target terminal corresponding to the different target mobile applications, whether to trigger subsequent operations related to the different target mobile applications includes: determining, by the cloud platform for each target mobile application, whether the spatial information change status of the target terminal corresponding to the target mobile application meets the spatial information based arbitration condition preset for the target mobile application; determining, by the cloud platform for each target mobile application, whether the time information of the target terminal corresponding to the target mobile application is within a preset time range; and if the two conditions are both met, triggering a subsequent operation related to the target mobile application; or if either of the two conditions is not met, skipping triggering a subsequent operation related to the target mobile application.

Optionally, that the cloud platform tracks a spatial information change of each target terminal, to obtain a change status of the spatial information of each target terminal includes: comparing, by the cloud platform, the current spatial information of each target terminal with spatial information of each target terminal obtained a preset time interval ago, to obtain a spatial information change increment of each target terminal.

The determining, by the cloud platform for each target mobile application, whether the spatial information change status of the target terminal corresponding to the target mobile application meets the spatial information-based arbitration condition preset for the target mobile application includes: determining, by the cloud platform for each target mobile application, whether the spatial information change increment of the target terminal corresponding to the target mobile application is greater than or equal to a spatial information change threshold preset for the target mobile application.

Optionally, that the cloud platform tracks a spatial information change of each target terminal, to obtain a change status of the spatial information of each target terminal includes: tracking a current spatial information change of each target terminal, to obtain a location area of each target terminal.

The determining, by the cloud platform for each target mobile application, whether the spatial information change status of the target terminal corresponding to the target mobile application meets the spatial information-based arbitration condition preset for the target mobile application includes: determining, by the cloud platform for each target mobile application, whether the location area of the target terminal corresponding to the target mobile application is a location area preset for the target mobile application.

Optionally, the triggering, by the cloud platform, subsequent operations related to the target mobile applications includes: notifying, by the cloud platform, the target mobile application of the spatial information change status of the target terminal corresponding to the target mobile application.

Optionally, the triggering, by the cloud platform, subsequent operations related to the target mobile applications includes: using, by the cloud platform, the spatial information of the target terminal corresponding to the target mobile application as a variable query condition; when a query condition change meets a preset condition, triggering a query for related information of the target mobile application; and pushing a query result to the target terminal corresponding to the target mobile application.

Optionally, the triggering, by the cloud platform, subsequent operations related to the target mobile applications includes: determining whether to allow the target terminal corresponding to the target mobile application to perform an operation on or to access data for which the preset permission is granted.

According to another aspect of the present disclosure, a cloud platform is further provided, where the cloud platform includes: a spatial information synchronization module configured to obtain current spatial information of each target terminal, where the spatial information indicates a location of the target terminal, the target terminal is communicatively connected to the cloud platform, a target mobile application is installed on the target terminal, and the target mobile application needs to obtain the spatial information of the target terminal; a space-time information change tracking module, configured to track the current spatial information of each target terminal obtained by the spatial information obtaining module, to obtain a spatial information change status of each target terminal; and a spatial (or space-time) information change arbitration module configured to: obtain system time information of the target terminal, where the time information indicates a current system time of the target terminal; and determine, based on spatial information-based arbitration conditions and time information-based arbitration conditions preset for different target mobile applications, and the spatial information change status and the time information, obtained by the spatial information change tracking module, of the target terminal corresponding to the different target mobile applications, whether to trigger subsequent operations related to the different target mobile applications.

Optionally, the space-time information change arbitration module includes a determining unit and a trigger unit.

The determining unit is configured to determine, for each target mobile application, whether the spatial information change status of the target terminal corresponding to the target mobile application meets the spatial information-based arbitration condition preset for the target mobile application.

The determining unit is further configured to determine, for each target mobile application, by the space-time information change arbitration module, whether the time information of the target terminal corresponding to the target mobile application is within a preset time range.

The trigger unit is configured to: if the determining unit determines that the two conditions are both met, trigger an operation related to the target mobile application; or if the determining unit determines that either of the two conditions is not met, skip triggering an operation related to the target mobile application.

Optionally, the spatial information change tracking module is configured to compare the current spatial information of each target terminal with spatial information of each target terminal obtained a preset time interval ago, to obtain a spatial information change increment of each target terminal.

The space-time information change arbitration module is configured to determine, for each target mobile application, whether the spatial information change increment of the target terminal corresponding to the target mobile application is greater than or equal to a spatial information change threshold preset for the target mobile application.

Optionally, the spatial information change tracking module is configured to track a current spatial information change of each terminal, to obtain a location area of each terminal.

The space-time information change arbitration module is configured to determine, for each target mobile application, whether the location area of the target terminal corresponding to the target mobile application is a location area preset for the target mobile application.

Optionally, the cloud platform further includes a push module. The space-time information change arbitration module is configured to determine, based on the spatial information-based arbitration conditions and the time information-based arbitration conditions preset for the different target mobile applications, and the spatial information change status and the time information, obtained by the spatial information change tracking module, of the target terminal corresponding to the different target mobile applications, whether to trigger the push module.

The push module is configured such that after being triggered by the space-time information change arbitration module, the push module notifies the target mobile application of the spatial information change status of the target terminal corresponding to the target mobile application.

Optionally, the cloud platform further includes a continuous query module.

The spatial or space-time information change arbitration module is configured to determine, based on the spatial information-based arbitration conditions and the time information based arbitration conditions preset for the different target mobile applications, and the spatial information change status and the time information, obtained by the spatial information change tracking module, of the target terminal corresponding to the different target mobile applications, whether to trigger the continuous query module. The continuous query module is configured to: after being triggered by the space-time information change arbitration module, use the spatial information of the target terminal corresponding to the target mobile application as a variable query condition; and when a query condition change meets a preset condition, trigger a query of a database for related information of the target mobile application; and push a query result to the target terminal corresponding to the target mobile application.

Optionally, the cloud platform further includes a permission management module.

The spatial or space-time information change arbitration module is configured to: determine, based on the spatial information-based arbitration conditions and the time information based arbitration conditions preset for the different target mobile applications, and the spatial information change status and the time information, obtained by the spatial information change tracking module, of the target terminal corresponding to the different target mobile applications, whether to trigger the permission management module. The permission management module is configured such that after being triggered by the space-time information change arbitration module, the permission management module determines, based on preset data access permission, whether to allow the target terminal corresponding to the target mobile application to perform an operation on or to access data for which the preset permission is granted.

According to another aspect of the present disclosure, a terminal is provided, where the terminal includes: a space-time information obtaining module configured to obtain current spatial information of the terminal, where the spatial information is used to indicate a location of the terminal, a target mobile application is installed on the terminal, and the target mobile application needs to obtain the spatial information of the terminal; a spatial information change tracking module configured to track the current spatial information of the terminal obtained by the spatial information obtaining module, to obtain a spatial information change status of the target terminal; and a space-time (or spatial) information change arbitration module configured to obtain system time information of the terminal, where the time information indicates a current system time of the terminal, and determine, based on spatial information-based arbitration conditions and time information-based arbitration conditions preset for different target mobile applications, and the spatial information change status and the time information of the terminal, whether to trigger subsequent operations related to the plurality of target mobile applications.

According to another aspect of the present disclosure, a terminal is provided, where the terminal includes: a space-time information obtaining module configured to obtain current spatial information of the terminal, where the spatial information is used to indicate a location of the terminal, a target mobile application is installed on the terminal, the target mobile application needs to obtain the spatial information of the terminal, and the terminal is communicatively connected to a cloud platform, and synchronizes the spatial information to the cloud platform; a spatial information change tracking module configured to track the current spatial information of the terminal obtained by the spatial information obtaining module, to obtain a spatial information change status of the target terminal; and a space-time (or spatial) information change arbitration module configured to obtain system time information of the terminal, where the time information indicates a current system time of the terminal, and determine, based on spatial information-based arbitration conditions and time information-based arbitration conditions preset for different target mobile applications, and the spatial information change status and the time information of the terminal, whether to trigger, on the terminal or the cloud platform, subsequent operations related to the plurality of target mobile applications.

Optionally, the terminal or the cloud platform further includes a push module. The space-time information change arbitration module is configured to determine, based on the spatial information-based arbitration conditions and the time information-based arbitration conditions preset for the different target mobile applications, the spatial information change, and the spatial information change status of the terminal obtained by the time information change tracking module, whether to trigger the push module.

The push module is configured such that after being triggered by the space-time information change arbitration module, the push module notifies the target mobile application of the spatial information change status of the terminal.

Optionally, the terminal or the cloud platform further includes a permission management module.

The space-time information change arbitration module is configured to determine, based on the spatial information-based arbitration conditions and the time information-based arbitration conditions preset for the different target mobile applications, and the spatial information change status and the time information of the terminal obtained by the spatial information change tracking module, whether to trigger the permission management module. The permission management module is configured such that after being triggered by the spatial information change arbitration module, the permission management module determines, based on preset data access permission, whether to allow the terminal to perform an operation on or to access data for which the preset permission is granted.

Optionally, the terminal or the cloud platform may further include a continuous query module.

The space-time information change arbitration module is configured to determine, based on the spatial information-based arbitration conditions and the time information-based arbitration conditions preset for the different target mobile applications, and the spatial information change status and the time information of the terminal obtained by the spatial information change tracking module, whether to trigger the continuous query module. The continuous query module is configured to: after being triggered by the spatial information change arbitration module, use the spatial information of the terminal as a variable query condition; when a query condition change meets a preset condition, trigger a query of a database for related information of the target mobile application; and push a query result to the terminal.

According to another aspect of the present disclosure, a cloud platform is further provided, where the cloud platform includes: a processor and a readable storage medium, where the readable storage medium is configured to store a program. The processor is configured to execute the program to perform the following steps: obtaining system time information of each target terminal and current spatial information of each target terminal, where the spatial information indicates a location of the target terminal, the target terminal is communicatively connected to the cloud platform, a target mobile application is installed on the target terminal, and the target mobile application needs to obtain the spatial information of the target terminal; tracking a spatial information change of each target terminal, to obtain a spatial information change status of each target terminal; and determining, based on spatial information-based arbitration conditions and time information-based arbitration conditions preset for different target mobile applications, and the spatial information change status and the time information of the target terminal corresponding to the different target mobile applications, whether to trigger subsequent operations related to the different target mobile applications.

Optionally, the determining, based on spatial information-based arbitration conditions and time information-based arbitration conditions preset for different target mobile applications, and the spatial information change status and the time information of the target terminal corresponding to the different target mobile applications, whether to trigger subsequent operations related to the different target mobile applications includes: determining, for each target mobile application, whether the spatial information change status of the target terminal corresponding to the target mobile application meets the spatial information-based arbitration condition preset for the target mobile application; determining, for each target mobile application, whether the time information of the target terminal corresponding to the target mobile application is within a preset time range; and if the two conditions are both met, triggering an operation related to the target mobile application; or if either of the two conditions is not met, skipping triggering an operation related to the target mobile application.

The present disclosure further provides a device-cloud collaboration apparatus, where the apparatus includes: a processor and a readable storage medium, where the readable storage medium is configured to store a program. The processor is configured to execute the program to perform the following steps: obtaining time information and current spatial information of the apparatus, where the time information indicates a current system time of the apparatus, the spatial information is used to indicate a location of the apparatus, the apparatus is communicatively connected to a cloud platform, a target mobile application is installed on the apparatus, and the target mobile application needs to obtain the spatial information of the apparatus; tracking the current spatial information of the apparatus, to obtain a spatial information change status of the apparatus; and determining, based on spatial information-based arbitration conditions and time information-based arbitration conditions preset for different target mobile applications, and the spatial information change status and the time information of the apparatus, whether to trigger subsequent operations related to the different target mobile applications.

According to another aspect of the present disclosure, a terminal is provided, where the terminal includes a radio frequency (RF) circuit, an input unit, a readable memory, a processor, a power supply, and a global positioning system (GPS) module.

The RF circuit is configured to send and receive a communication signal.

The display unit is configured to display a user interaction interface.

The input unit is configured to receive entered numeral or character information.

The readable storage medium is configured to store a preset quantity of programs and interface information of the terminal.

The power supply is configured to supply power to the terminal.

The GPS module is configured to obtain spatial information of the terminal.

The processor is configured to execute the program to implement the following steps: obtaining current spatial information of the terminal, where the spatial information is used to indicate a location of the terminal, the terminal is communicatively connected to the cloud platform, a target mobile application is installed on the terminal, and the target mobile application needs to obtain the spatial information of the terminal; tracking the current spatial information of the terminal, to obtain a spatial information change status of the terminal; and determining, based on spatial information-based arbitration conditions preset for different target mobile applications and the spatial information change status of the terminal, whether to trigger subsequent operations related to the different target mobile applications.

Optionally, the determining, based on spatial information-based arbitration conditions preset for different target mobile applications and the spatial information change status of the terminal, whether to trigger subsequent operations related to the different target mobile applications includes: determining, for each target mobile application, whether the spatial information change status of the terminal meets the spatial information-based arbitration condition preset for the target mobile application; and if the arbitration condition is met, triggering a subsequent operation related to the target mobile application; or if the arbitration condition is not met, skipping triggering a subsequent operation related to the target mobile application.

According to the foregoing technical solutions in the embodiments of the present disclosure, the device-cloud collaboration platform obtains spatial information of a plurality of terminals connected to the platform, to natively support spatial data of a user, and performs arbitration based on a spatial information change and spatial information-based arbitration conditions corresponding to different target mobile applications, to block a change in which the user is not interested, and trigger a subsequent operation related to the mobile application, in order to better meet a diversified requirement of the mobile application for the spatial information, and facilitate development of the mobile application.

BRIEF DESCRIPTION OF DRAWINGS

To describe the technical solutions in the embodiments of the present disclosure or in other approaches more clearly, the following briefly describes the accompanying drawings for describing the embodiments or other approaches. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Certainly, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The following clearly and completely describes the technical solutions in the embodiments of the present disclosure with reference to the accompanying drawings in the embodiments of the present disclosure. Certainly, the described embodiments are some rather than all of the embodiments of the present disclosure. All other embodiments obtained by persons of ordinary skill in the art based on the embodiments of the present disclosure without creative efforts shall fall within the protection scope of the present disclosure.

Figure 1:
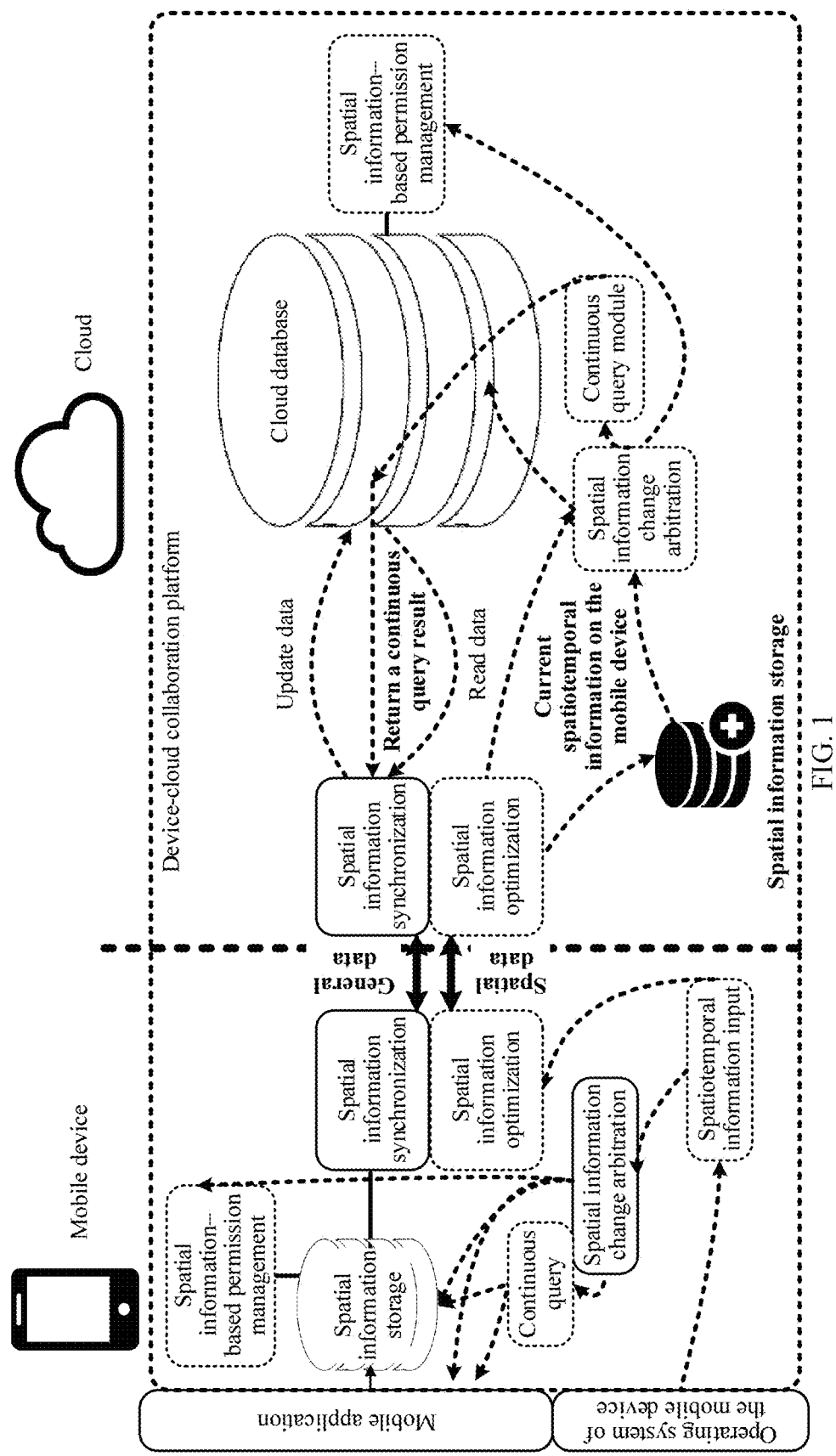
FIG. 1 is a schematic diagram of an application scenario of a system according to an embodiment of the present disclosure.

FIG. 1 is a schematic diagram of an application scenario of a system according to an embodiment of the present disclosure. As shown in FIG. 1, in a device-cloud collaboration platform in the present disclosure, a "device" is a mobile device, and a "cloud" is a cloud. A basic idea of the device-cloud collaboration platform is that the platform automatically processes data synchronization between the mobile device and the cloud (a cloud platform). The device-cloud collaboration platform supports a typical data consistency model, and a concurrency control and transaction model in a mobile application, and hides complex data flows and software and hardware configuration processes from a mobile application developer, to greatly simplify mobile application development.

The device-cloud collaboration platform in other approaches provides little support for spatial data of a user at an application layer, and native support is absent. Consequently, a mobile application obtains, stores, queries, and manages the spatial data of the user in a complex and inefficient manner, and this needs to be optimized. Embodiments of the present disclosure intend to provide a convenient, flexible, and efficient user spatial information-based application development platform for the mobile application developer through collaboration between the device and the cloud platform.

The device-cloud platform in the embodiments of the present disclosure provides a plurality of user spatial information-specific modules for the mobile application developer. When a specific mobile application is deployed on the platform, these modules may be invoked according to implementation logic of the application, to form a unique data path of each mobile application.

FIG. 1 is a schematic diagram of an application scenario of a device-cloud platform according to an embodiment of the present disclosure. As shown in FIG. 1, A: a mobile device system spatial information input and B: a mobile device spatial information change arbitration module are added to a mobile device. C: A spatial databased permission management component is added to a data permission management module.

D: a user historical spatial information database, E: a cloud spatial information change arbitration module, and F: a continuous query management module of a cloud database are added to the cloud. G: a spatial databased permission management component is added to the data permission management module.

In components of the device-cloud collaboration platform, an existing device-cloud data synchronization module is improved, and H: an optimized spatial data synchronization attachment is added.

Functions of the new modules are described as follows.

A: The mobile device system spatial information or time information obtaining: seamlessly introduces current spatial information or time information of a user into a device-cloud collaboration platform system, to be used by a mobile application on the platform.

B: The (mobile device) spatial information or time information change arbitration module: receives a setting of the mobile application; tracks spatial information change input of a mobile device system; blocks, for each specific mobile application on the platform, a spatial change that is not interested (a change that is excessively small, excessively large, or the like) by the mobile application; and provides a suitable spatial information or time information change for the mobile application or the corresponding permission management component.

C: The (mobile device) spatial databased permission management: receives the current spatial information or the time information of the user, and determines, based on the current spatial information or the time information, whether the current user has permission to access data.

D: The user historical spatial database: A historical spatial database of the user is established on the cloud, to automatically synchronize with spatial information or time information of the user on the mobile device; and provide historical data for a mobile application that is permitted by the user for query and data mining, which enhances the value of the device-cloud collaboration platform.

E: The (cloud) spatial information or time information change arbitration module: receives the current spatial information or the time information (the time information may also be learned by the cloud according to a current system time in a network) of the user sent from the mobile device; blocks, for each specific mobile application on the platform, a spatial change that is not interested (a change that is excessively small, excessively large, or the like) by the mobile application; and provides a suitable spatial information or time information change for a cloud database corresponding to the mobile application for further processing (for example, continuous query or cloud data permission management).

F: The continuous query management module (of a cloud database): manages, using the current spatial information or the time information (arbitrated) of the user as an input, a continuous query on the cloud database by the mobile application.

G: The (cloud) spatial databased permission management: receives the current spatial information or the time information of the user, and determines, based on the current spatial information or the time information, whether the current user has permission to access the cloud data.

H: The optimized spatial data synchronization attachment: improves, for spatial data of the user and based on unique characteristics such as sequencing and continuity of the spatial data of the user, a data synchronization technology and a consistency model on the existing device-cloud collaboration platform, in order to automatically synchronize the spatial data of the user between the mobile device and the cloud.

FIG. 1 shows possible connections between the mobile device and the cloud.

It should be noted that the foregoing modules are functional modules added to the device-cloud collaboration platform for the spatial data of the user. During construction of the device-cloud collaboration platform, only some of the modules may be selected for deployment. Diversified module settings can provide flexible implementations for mobile application development. When a specific mobile application is developed on the platform, the application developer may invoke the modules according to a requirement, to form a unique data path of the mobile application. Certainly, in an embodiment, for better availability, a default spatial information or time information path may alternatively be provided, which is described as follows: When the mobile application is deployed on the mobile device, if the user authorizes the device-cloud collaboration platform to access the spatial data of the user, the device-cloud collaboration platform automatically configures an input of the spatial information or the time information, synchronizes the spatial information or the time information of the mobile device with the cloud, and automatically synchronizes the spatial information or the time information to the cloud user historical spatial database (spatial information storage in FIG. 1). In this case, a data path is formed.

The following describes in detail functions of the cloud, the terminal, and the entire system mentioned in FIG. 1.

Figure 2A:
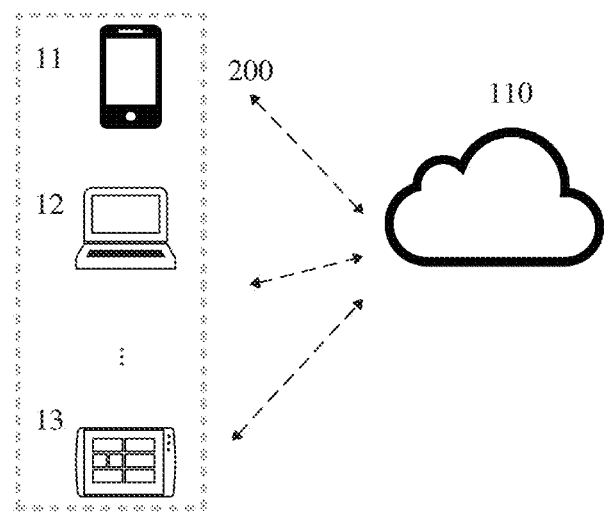
FIG. 2A is a schematic diagram of a device-cloud platform system according to Embodiment 1 of the present disclosure.

FIG. 2A is a structural diagram of a device-cloud collaboration platform system according to the present disclosure. The system includes a terminal side 200 and a cloud platform 110. The terminal side 200 includes a plurality of terminals that construct the device-cloud collaboration platform system, and the terminals herein are mobile devices in various forms, including a mobile phone, a tablet computer, a personal digital assistant (PDA), a vehicle-mounted terminal, a wearable device, a smart terminal, and the like. FIG. 2A shows only terminals 11, 12, and 13 as an example. In an embodiment, the cloud platform 110 may be implemented by a computer server or a cluster server including a plurality of servers.

In Embodiment 1 of the present disclosure, the terminals 11, 12, and 13 are configured to obtain respective current spatial information. The spatial information herein may be positioning information of a user obtained by the terminal, or may be other information related to a user location. In addition, the spatial information of the user is synchronized to the cloud platform. In the synchronization process, the terminal may periodically obtain and send the spatial information to the cloud platform 110, or the cloud platform 110 may actively obtain the spatial information, or the user actively provides the spatial information, or there is another information synchronization manner.

The terminals each may be connected to the cloud platform through a wireless network. A mobile application developed based on the device-cloud collaboration platform in the present disclosure is installed on or can be installed on all the terminals in Embodiment 1 of the present disclosure shown in FIG. 2A, and types and quantities of mobile applications installed on the terminals may be different.

The cloud platform 110 is configured to track a spatial information change of each terminal in the system, to obtain a spatial information change status of each terminal. There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time.

The obtaining a spatial information change may alternatively be: comparing the current spatial information of the terminal with spatial information of the terminal obtained a preset time interval ago, to obtain a spatial information change range of each target terminal. In an embodiment, for example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

The cloud platform 110 determines, based on spatial information-based arbitration conditions and a spatial information change status of the terminal, whether to trigger a subsequent operation related to the mobile application.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week.

Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas.

The subsequent operation is performed based on a setting of the application developer. Therefore, subsequent operations of different mobile applications triggered after the spatial information change is arbitrated are different.

The subsequent operation may be triggering permission management: receiving the current spatial information of the user, and determining, based on the current spatial information, whether the user has permission to access or operate data. The permission may be user access permission specified by the mobile application based on a user classification, or may be user permission set by the user. The permission for data, for example, a location and a time at which the user can access or operate the data, may be set by the user on the mobile application.

The subsequent operation may be triggering a continuous query: managing, using the current spatial information of the user as an input, a continuous query on a mobile device database or a cloud database by the mobile application, and returning obtained data to the mobile terminal. Optionally, the mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is pushed to the user.

The subsequent operation may alternatively be triggering push: notifying, after the spatial information change meets a preset condition, the mobile application of the spatial information change status of the terminal corresponding to the mobile application.

The subsequent triggering process is set by the mobile application developer based on a feature of a developed mobile application. A subsequent operation may alternatively be performed at a different location in the system based on a requirement, for example, may be performed on the cloud platform or the terminal. In addition, tracking of the spatial information change and arbitration of the spatial information change, generally, some simple change arbitration that requires a relatively small amount of data, may alternatively be performed on the terminal.

The cloud platform 110 may be further configured to store historical spatial information of the user, to be more specific, the spatial information of the user obtained each time is stored as a historical record. The information may be stored on the terminal, or may be stored on both the terminal and the cloud. For example, the terminal stores a small amount of recent historical data, and the cloud may be used to store a large amount of historical data of the user. The storage of the historical spatial information of the user is an optional function of the cloud or the terminal.

The mobile application requires the current spatial information, and may require the historical spatial information of the user for increment comparison or analysis, and perform data analysis or even data mining on the historical spatial information of the user. Therefore, the storage of the historical spatial information of the user provides historical data for a mobile application that is permitted by the user for query and data mining, which enhances the value of the device-cloud collaboration platform; and facilitates determining of a complex spatial information change. The historical spatial information is used to record the historical spatial data of the user. Therefore, the historical spatial information may be accordingly stored and recorded based on a historical time.

Figure 2B:
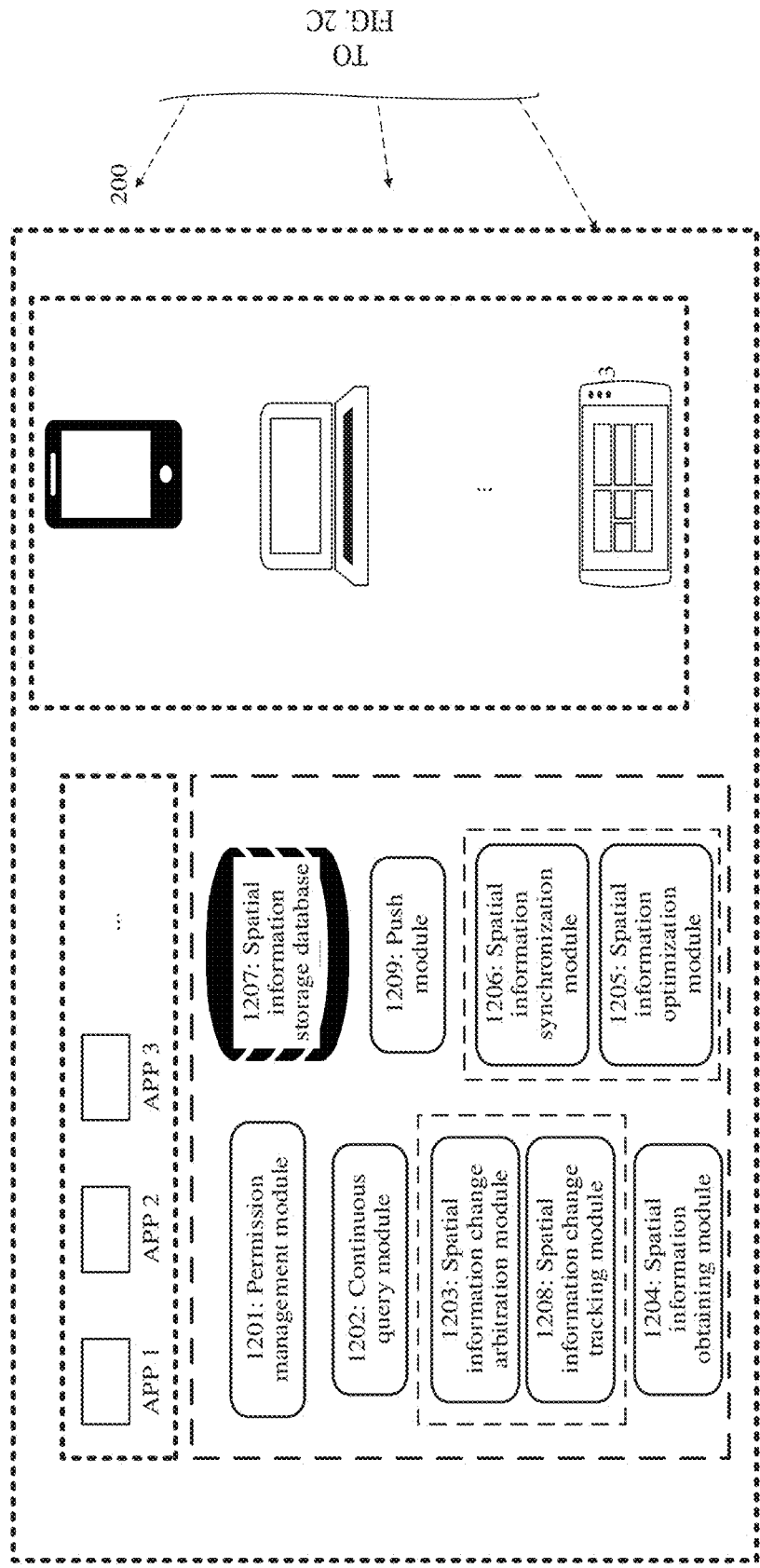
FIG. 2B and FIG. 2C are schematic structural diagrams of a device-cloud platform according to Embodiment 1 of the present disclosure.
Figure 2C:
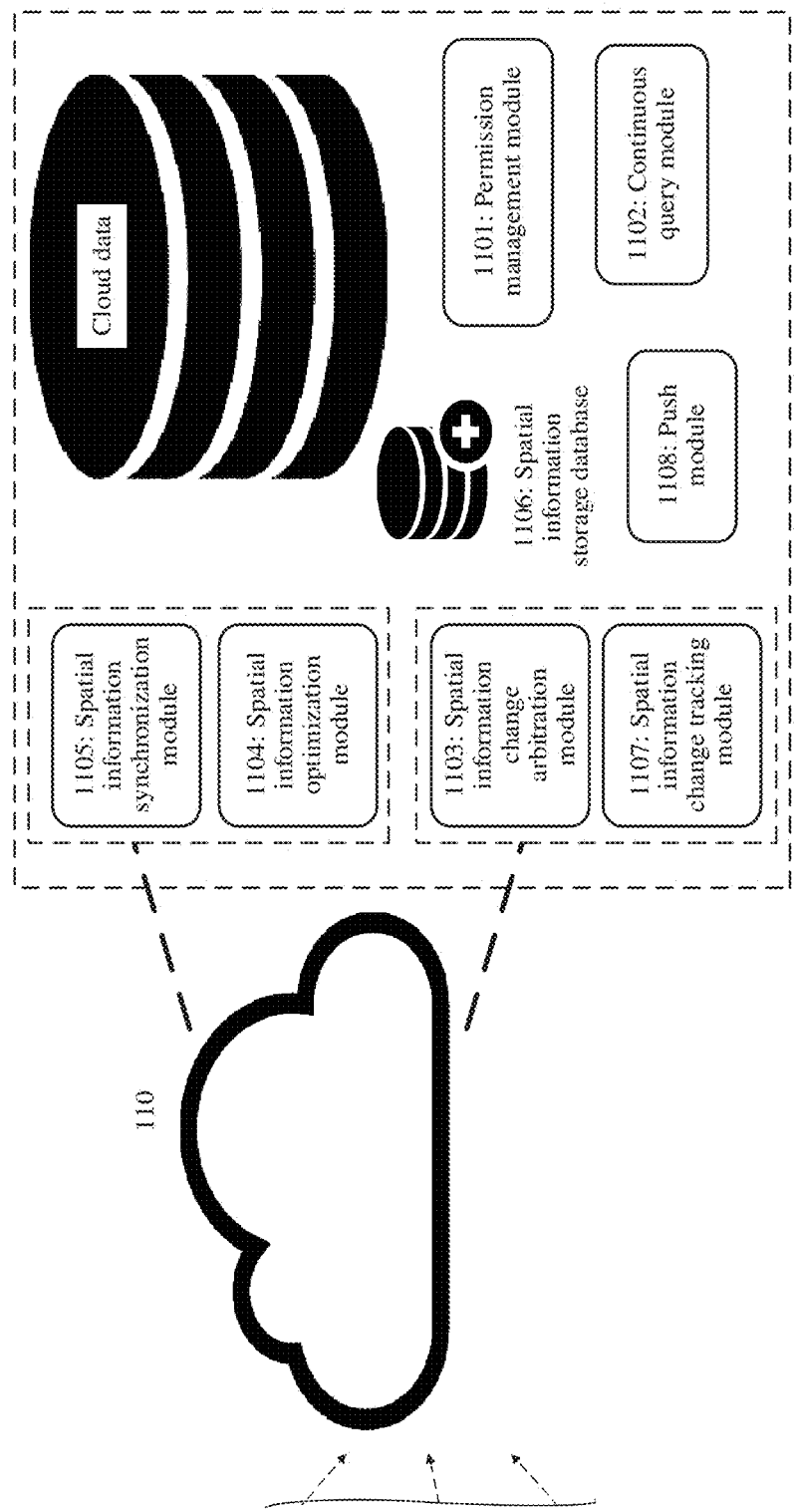

FIG. 2B and FIG. 2C are schematic structural diagrams of a device-cloud platform according to Embodiment 1 of the present disclosure. The device-cloud platform includes a terminal side 200 and a cloud platform 110. The terminal side 200 may be one or more terminal devices in different forms. The terminal side 200 and the cloud platform 110 jointly form the device-cloud platform. The terminal herein is a mobile device in various forms, including a mobile phone, a tablet computer, a PDA, a vehicle-mounted terminal, a wearable device, a smart terminal, and the like. In an embodiment, the cloud platform 110 may be implemented by a computer server or a cluster server including a plurality of servers.

A mobile application developed based on the device-cloud collaboration platform of the present disclosure is installed on or can be installed on all terminals on the terminal side 200, and types and quantities of mobile applications installed on the terminals may be different. Each terminal on the terminal side 200 is provided with a spatial information obtaining module 1204 and a spatial information synchronization module 1206. The terminal may further include: a spatial information change tracking module 1208, a spatial information change arbitration module 1203, a spatial information permission management module 1201, a continuous query module 1202, a spatial information optimization module 1206, a spatial information storage database 1207, and a push module 1209.

Modules disposed on the cloud platform 110 include: a spatial information synchronization module 1105, a spatial information change tracking module 1107, and a spatial information change arbitration module 1103. The cloud platform 110 may further include: a permission management module 1101, a spatial information storage database 1106, a continuous query module 1102, a spatial information optimization module 1104, and a push module 1108.

The functions of the modules are described as follows.

The spatial information obtaining module 1204 is configured to seamlessly introduce current spatial information of a user of the terminal into a device-cloud collaboration platform system. The spatial information may be obtained in the following manners: actively provided by the user, periodically extracted by a mobile device at a specific frequency, actively obtained by a cloud at a specific frequency, or the like. The spatial information is related to a user location, and may be longitude and latitude information, coordinate information on a map, or the like. The spatial information obtaining module 1204 is further configured to provide the obtained spatial information to another module.

The spatial information synchronization module 1206 is configured to obtain the spatial information of the terminal from the spatial information obtaining module 1204, and synchronize spatial data of the user between the mobile device and the cloud, to maintain consistency in the spatial information between the mobile device and the cloud.

The spatial information change tracking module 1208 is configured to: receive the spatial information of the terminal sent by the spatial information obtaining module 1204 or obtain the spatial information of the terminal from the spatial information obtaining module 1204; and track a spatial information change of the mobile device based on the obtained spatial information of the terminal. There may be a plurality of manners of obtaining the spatial information change of the terminal, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

Figure 4A:
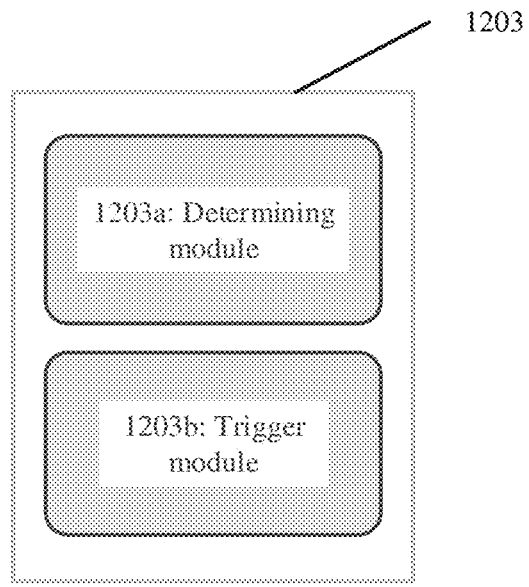
FIG. 4A is a schematic structural diagram of a spatial information change arbitration module on a terminal side according to Embodiment 1 of the present disclosure.

The spatial information change arbitration module 1203 is configured to determine, based on spatial information-based arbitration conditions and the spatial information change status of the terminal obtained from the spatial information change tracking module 1208, whether to trigger a subsequent operation related to the mobile application. As shown in FIG. 4A, the spatial information change arbitration module 1203 may be further divided into a determining unit 1203*a* and a trigger unit 1203*b*. The determining unit 1203*a* is configured to determine whether a spatial information change status of a target terminal corresponding to the target mobile application meets a spatial information-based arbitration condition preset for the target mobile application. The trigger unit 1203*b* is configured to: if the determining unit 1203*a* determines that the arbitration condition is met, trigger a subsequent operation related to the target mobile application; or if the determining unit 1203*a* determines that the arbitration condition is not met, skip triggering a subsequent operation related to the target mobile application.

During invoking the spatial information change arbitration module 1203, the mobile developer sets the spatial information-based arbitration conditions based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas.

The subsequent operation triggered by the trigger unit 1203*b* is performed based on a setting of the application developer. Therefore, subsequent operations of different mobile applications triggered after the spatial information change is arbitrated are different. The subsequent operation may be triggering invoking of another module on the device-cloud platform, for example, the spatial information permission management module 1201, the continuous query module 1202, or the push module 1209; or triggering the mobile application to query data in the cloud database and push the data to the terminal; or triggering another corresponding module on the cloud, for example, the permission management module 1101, the spatial information storage database 1106, the continuous query module 1102, and the push module 1108. The spatial information change arbitration module 1203 of the mobile device is an optional module on the device-cloud platform. When the cloud is provided with the spatial information change arbitration module 1103, the terminal may not be provided with the spatial information change arbitration module 1203, and spatial information change arbitration is performed on the cloud. Alternatively, the terminal and the cloud each are provided with the spatial information change arbitration module. The spatial information change arbitration module 1203 of the terminal is configured to perform some simple change arbitration that requires a relatively small amount of data, and the spatial information change arbitration module 1103 of the cloud is configured to perform some complex change arbitration that requires a relatively large amount of computation or requires a relatively large amount of historical data. Alternatively, the terminal and the cloud each are provided with the spatial information change arbitration module. The mobile application developer selects, for invocation, either of the modules depending on a requirement. Therefore, different requirements of different mobile application developers can be met. The spatial information change tracking module 1208 is configured to provide arbitration information for the spatial information change arbitration module 1203. Therefore, the spatial information change tracking module 1208 is usually disposed together with the spatial information change arbitration module 1203. In other words, if the spatial information change arbitration module 1203 is disposed on the terminal, the spatial information change tracking module 1208 is also disposed.

The permission management module 1201 is configured to receive the current spatial information of the user, and determine, based on the current spatial information, whether the user has permission to access or operate data. The determining herein may be performed based on a setting of access permission by the application developer, for example, determine to allow access to specific data only at a specific location, allow access to specific data only in a specific time period, and allow access to data only at a specific location at a specific time. The data herein may be cloud data or application-related data. When the user does not have permission to access application data, an application cannot be triggered. The permission management module 1201 may be triggered for invocation after the spatial information change arbitration module 1203 or the spatial information change arbitration module 1103 arbitrates the spatial information change. The foregoing invocation is not an inevitable trigger step after the spatial information change arbitration module 1203 or the spatial information change arbitration module 1103 arbitrates the spatial information change, but may be flexibly performed according to requirements of different mobile application developers.

The spatial information storage database 1207: The mobile application requires the current spatial information, and may require historical spatial information of the user for increment comparison or analysis, and perform data analysis or even data mining on the historical spatial information of the user. Therefore, the spatial information storage database 1207 of the user is established on the mobile device, to provide the historical data for a mobile application that is permitted by the user for query and data mining, which enhances the value of the device-cloud collaboration platform; and to facilitate determining of a complex spatial information change of the user by the spatial information change tracking module 1208/1107. Because a storage capacity of the mobile device is limited, the spatial information storage database 1207 of the mobile device may store only a small amount of historical spatial information based on an actual requirement, to meet a requirement of processing a small amount of data on the mobile device side of the device-cloud collaboration platform. The historical spatial information is used to record the historical spatial data of the user. Therefore, the historical spatial information may be accordingly stored and recorded based on a historical time.

The continuous query module 1202 is configured to be triggered for invocation after the spatial information change arbitration module 1203 or the spatial information change arbitration module 1103 arbitrates the spatial information change. The foregoing invocation is not an inevitable trigger step after the spatial information change arbitration module 1203 or the spatial information change arbitration module 1103 arbitrates the spatial information change, but may be flexibly performed according to requirements of different mobile application developers. The continuous query module 1202 may be triggered to manage, using the current spatial information of the user as an input, a continuous query on a mobile device database or a cloud database by the mobile application, and return obtained data to the mobile terminal. The mobile application is allowed to set a trigger frequency or duration for the continuous query on the platform. The mobile application stops the continuous query when the duration is reached or a quantity of continuous queries reaches an upper limit. This allows more flexibility.

An optimized spatial information synchronization module 1205 is configured to improve, based on unique characteristics such as sequencing and continuity of the spatial information of the user, the spatial information of the user through a data synchronization technology and a consistency model on the existing device-cloud collaboration platform, in order to automatically synchronize the spatial data of the user between the mobile device and the cloud.

The push module 1209 is configured to be triggered for invocation after the spatial information change arbitration module 1203 or the spatial information change arbitration module 1103 arbitrates the spatial information change. The foregoing invocation is not an inevitable trigger step after the spatial information change arbitration module 1203 or the spatial information change arbitration module 1103 arbitrates the spatial information change, but may be flexibly performed according to requirements of different mobile application developers. The push module 1209 is configured to: after being triggered by the spatial information change arbitration module, notify a mobile application of a spatial information change status of the terminal corresponding to the mobile application. In other words, when the spatial information change arbitration module 1203 or the spatial information change arbitration module 1103 determines that the spatial information change meets a preset condition, the push module 1209 is triggered. The push module 1209 notifies a corresponding mobile application of a spatial information change status of the terminal.

The spatial information synchronization module 1105 is configured to obtain the spatial information of the user sent by the terminal, to maintain consistency in spatial information between the cloud and the mobile device. The obtained spatial information of the user may be the spatial information of the user sent by the spatial information synchronization module 1206 of the terminal.

The spatial information change tracking module 1107 is configured to: receive the spatial information of the terminal sent by the spatial information synchronization module 1105 or obtain the spatial information of the terminal from the spatial information obtaining module 1204, and track the spatial information change of the mobile device based on the obtained spatial information of the terminal. There may be a plurality of manners for the spatial information change tracking module 1107 to track the spatial information change of the terminal, including: tracking a current spatial information change of the terminal, to obtain a location area of the terminal, for example, a city where the terminal is located, or a street where the terminal is located, and determine whether the user of the terminal is at home or at school at this time. That the spatial information change tracking module 1107 tracks the spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by the mobile application developer for obtaining the spatial information, because time intervals at which the spatial information is obtained may be different for different mobile applications. In addition to the foregoing examples, there may be another manner of tracking the spatial information change status.

The spatial information change arbitration module 1103 is configured to determine, based on the spatial information-based arbitration conditions and the spatial information change status of the terminal obtained from the spatial information change tracking module 1107, whether to trigger a subsequent operation related to the mobile application.

Figure 4B:
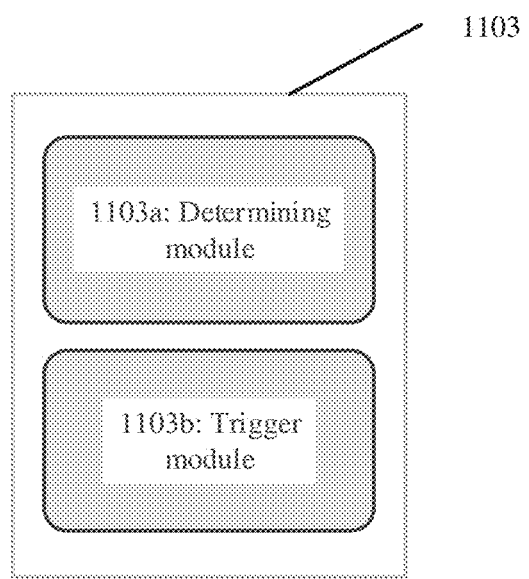
FIG. 4B is a schematic structural diagram of a spatial information change arbitration module on a cloud platform according to Embodiment 1 of the present disclosure.

As shown in FIG. 4B, the spatial information change arbitration module 1103 may be further divided into a determining unit 1103a and a trigger unit 1103b. The determining unit 1103*a* is configured to determine whether a spatial information change status of a target terminal corresponding to the target mobile application meets a spatial information-based arbitration condition preset for the target mobile application. The trigger unit 1103*b* is configured to: if the determining unit 1103*a* determines that the arbitration condition is met, trigger a subsequent operation related to the target mobile application; or if the determining unit 1103*a* determines that the arbitration condition is not met, skip triggering a subsequent operation related to the target mobile application.

Optionally, in an embodiment, the change arbitration module on the cloud and the change arbitration module on the mobile device may work cooperatively or independently, depending on an application scenario. For example, a condition "arbitration is triggered only when you move by 1000 meters" is quite simple and therefore arbitration may be performed on the mobile device side. However, for example, a condition "arbitration is triggered only when you moved to a place visited by you one year ago" is quite complex, because spatial data of the terminal one year ago needs to be obtained and the data may be stored on the cloud. In this case, the arbitration module on the cloud is used to perform arbitration. For a condition "you moved by 1000 meters and visited here a year ago", collaboration of the two modules is required. Certainly, under this condition, the cloud may perform arbitration independently or not depending on strength of a computing capability of the cloud.

Generally, the spatial information change arbitration module 1103 is a gate, a change that does not meet a condition is filtered out, and a change that meets the condition is guided for execution, for example, is used to trigger the continuous query module 1102 to perform continuous query.

During invoking the spatial information change arbitration module 1103, the mobile developer sets the spatial information-based arbitration conditions based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas.

The subsequent operation triggered by the trigger unit 1103*b* is performed based on a setting of the application developer. Therefore, subsequent operations of different mobile applications triggered after the spatial information change is arbitrated are different. The subsequent operation may be triggering invoking of another module on the device-cloud platform, for example, the permission management module 1101, the spatial information storage database 1106, the continuous query module 1102, or the push module 1108; or triggering the mobile application to query data in the cloud database and push the data to the terminal; or triggering a corresponding module on the terminal, for example, the spatial information permission management module 1201, the continuous query module 1202, and the push module 1209. When the spatial information change arbitration module 1103 is disposed on the cloud, the spatial information change arbitration module 1203 may be selectively disposed on the terminal. The spatial information change arbitration module 1203 of the terminal is configured to perform some simple change arbitration that requires a relatively small amount of data, and the spatial information change arbitration module 1103 of the cloud is configured to perform some complex change arbitration that requires a relatively large amount of computation or requires a relatively large amount of historical data. Alternatively, all spatial information change arbitration may be performed on the cloud. When the cloud and the terminal are provided with the spatial information change arbitration module 1103 and the spatial information change arbitration module 1203 respectively, the mobile application developer selects, for invocation, either of the modules depending on a requirement. Therefore, different requirements of different mobile application developers can be met. The spatial information change tracking module 1107 is configured to provide arbitration information for the spatial information change arbitration module 1103. Therefore, the spatial information change tracking module 1107 is usually disposed together with the spatial information change arbitration module 1103. In other words, if the spatial information change arbitration module 1103 is disposed on the terminal, the spatial information change tracking module 1107 is also disposed.

The permission management module 1101 is configured to: receive the current spatial information of the user, and determine, based on the current spatial information, whether the user has permission to access or operate data. The spatial information may be received from the spatial information change arbitration module 1103, the spatial information change tracking module 1107, the spatial information synchronization module 1105, or another module that can provide location information of the user. The permission may be user access permission specified by the mobile application based on a user classification, or may be user permission set by the user. The permission for data, for example, a location and a time at which the user can access or operate the data, may be set by the user on the mobile application.

The determining herein may be performed based on a setting of access permission by the application developer, for example, determine to allow access to specific data only at a specific location, allow access to specific data only in a specific time period, and allow access to data only at a specific location at a specific time. The data herein may be cloud data or application-related data. When the user does not have permission to access application data, an application cannot be triggered. The permission management module 1101 may be triggered for invocation after the spatial information change arbitration module 1103 or the spatial information change arbitration module 1203 arbitrates the spatial information change. The foregoing invocation is not an inevitable trigger step after the spatial information change arbitration module 1103 or the spatial information change arbitration module 1203 arbitrates the spatial information change, but may be flexibly performed according to requirements of different mobile application developers.

The spatial information storage database 1106: The mobile application requires the current spatial information, and may require the historical spatial information of the user for increment comparison or analysis, and perform data analysis or even data mining on the historical spatial information of the user. Therefore, the spatial information storage database 1106 of the cloud needs to be established, to provide the historical data for a mobile application that is permitted by the user for query and data mining, which enhances the value of the device-cloud collaboration platform; and to facilitate determining of a complex spatial information change of the user by the spatial information change tracking module 1208/1107. The historical spatial information is used to record the historical spatial data of the user. Therefore, the historical spatial information may be accordingly stored and recorded based on a historical time.

The continuous query module 1102 is configured to be triggered for invocation after the spatial information change arbitration module 1103 or the spatial information change arbitration module 1203 arbitrates the spatial information change. The foregoing invocation is not an inevitable trigger step after the spatial information change arbitration module 1103 or the spatial information change arbitration module 1203 arbitrates the spatial information change, but may be flexibly performed according to requirements of different mobile application developers. The continuous query module 1102 may be triggered to manage, using the current spatial information (arbitrated) of the user as an input, a continuous query on the mobile device database or the cloud database by the mobile application, and return obtained data to the mobile terminal, where the spatial information may be from the spatial information change arbitration module 1103, the spatial information change tracking module 1107, the spatial information synchronization module 1105, or another module that can provide the location information of the user. The mobile application is allowed to set a trigger frequency or duration for the continuous query on the platform. The mobile application stops the continuous query when the duration is reached or a quantity of continuous queries reaches an upper limit. This allows more flexible mobile application development.

In an application scenario, a client registers a query with a database (In other words, a specific framework of the query is established), and sets the spatial information as a variable query condition. When the query condition changes, and the spatial information change arbitration module 1103 determines that the change meets a condition (for example, the change is large enough), middleware (for example, the continuous query module 1102 in the device-cloud platform in this embodiment of the present disclosure) is triggered to re-trigger a query. Each change triggers only one query. From a perspective of the user, a change that meets the condition triggers a query, which does not need to be triggered by the user, and seems to be continuous. This is the origin of a continuous query.

In an application scenario, a continuous query is performed: please show restaurants 1 kilometer around my location after I move by 10 kilometers. The variable query condition is "my location", and the arbitration condition of arbitration is "whether a current location is more than 10 kilometers away from a location where the query is triggered". Each time the spatial information change arbitration module 1103 determines a location change, the spatial information change arbitration module 1103 compares the location change with a previous location change, and only when a location change exceeds 10 kilometers, the location change is pushed to the continuous query module, that is, the continuous query module is triggered to perform a query.

In an application scenario, the spatial information change arbitration module 1103 determines that a mobile user moves by 10 kilometers, and the location change meets a trigger condition, and therefore triggers the continuous query module to perform a continuous query. The continuous query module keeps tracking the location change of the mobile user within a period of time or at a specific frequency and pushes the change accordingly. For example, it is determined through location arbitration that the user has arrived in Xi'an, and a continuous query is triggered. Then, through the continuous query, corresponding content of a street where the user is located is pushed to the user, for example, snacks and unique scenic spots nearby.

An optimized spatial information synchronization module 1104 is configured to improve, based on unique characteristics such as sequencing and continuity of the spatial information of the user, the spatial information of the user through a data synchronization technology and a consistency model on the existing device-cloud collaboration platform, in order to automatically synchronize the spatial data of the user between the mobile device and the cloud.

The push module 1108 is configured to be triggered for invocation after the spatial information change arbitration module 1103 or the spatial information change arbitration module 1203 arbitrates the spatial information change. The foregoing invocation is not an inevitable trigger step after the spatial information change arbitration module 1103 or the spatial information change arbitration module 1203 arbitrates the spatial information change, but may be flexibly performed according to requirements of different mobile application developers. The push module 1108 is configured to: after being triggered by the spatial information change arbitration module, notify a mobile application of a spatial information change status of the terminal corresponding to the mobile application. In other words, when the spatial information change arbitration module 1103 or the spatial information change arbitration module 1203 determines that the spatial information change meets a preset condition, the push module 1108 is triggered. The push module 1108 notifies a corresponding mobile application of the spatial information change status of the terminal.

It should be noted that, an objective of the foregoing embodiment of the present disclosure is to provide a device-cloud collaboration platform, in order to provide native support for the mobile application developer in terms of spatial information of a user, and provide related modules for the spatial information of the user. When a specific mobile application is deployed on the platform, these modules are selectively invoked according to a specific requirement of the application developer, to form a unique data path. Therefore, when designing the device-cloud platform, some or all of the foregoing modules can be deployed depending on performance of the device-cloud platform or a type of a served application developer. For flexibility of application development, some modules may be deployed on both the mobile device and the cloud, or deployed only on the cloud or only on the terminal.

Figure 5:
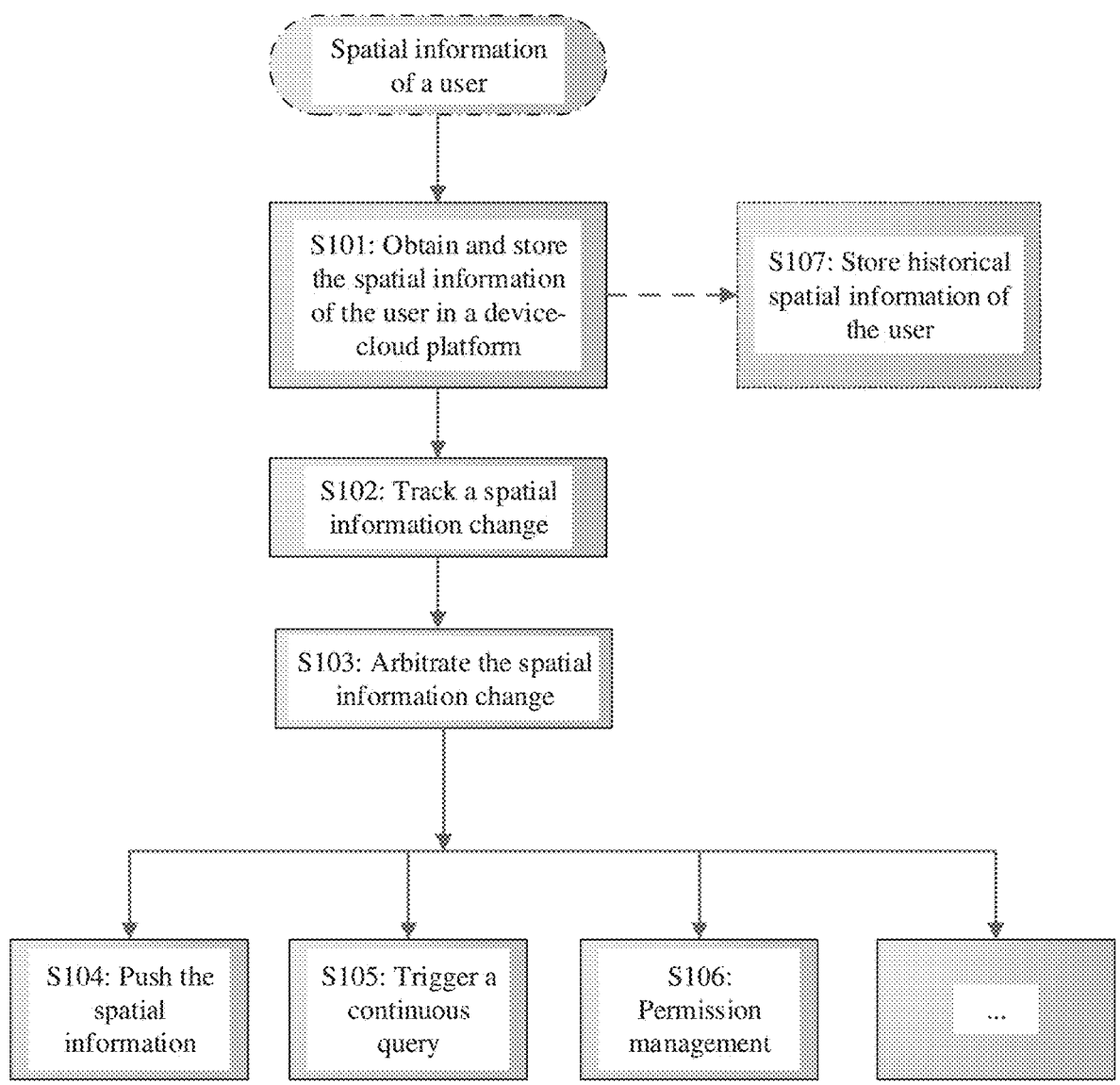
FIG. 5 is a flowchart of a method according to Embodiment 1 of the present disclosure.

FIG. 5 is a flowchart of a method according to Embodiment 1 of the present disclosure. The method according to Embodiment 1 of the present disclosure is shown as follows.

S101: Obtain current spatial information of each terminal in a system. The spatial information herein may be positioning information of a user obtained by the terminal, or may be other information related to a user location.

The spatial information of the user is obtained by a device-cloud platform. To be more specific, the terminal obtains the spatial information of the user, optimizes the spatial information, and synchronizes optimized spatial information to a cloud. Alternatively, the terminal directly synchronizes the spatial information of the user to a cloud platform after obtaining the spatial information. In a process of obtaining the spatial information, the terminal may periodically obtain and synchronize the spatial information, or the cloud actively obtains the spatial information, or the user actively provides the spatial information, or there is another manner of obtaining the spatial information.

S102: Track a spatial information change of each terminal in the system, to obtain a spatial information change status of each terminal.

There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status. S102 may be performed on the cloud, or may be performed on the terminal.

S103: Determine, based on spatial information-based arbitration conditions and the spatial information change status of the terminal, whether to trigger a subsequent operation related to a mobile application.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas. S103 may be performed on the cloud, or may be performed on the terminal.

The subsequent operation is performed based on a setting of the application developer. Therefore, subsequent operations of different mobile applications triggered after the spatial information change is arbitrated may be different.

The subsequent operation may be S104: push the spatial information, that is, notify, after the spatial information change meets a preset condition, the mobile application of the spatial information change status of the terminal corresponding to the mobile application.

The subsequent operation may be S105: trigger a continuous query, that is, manage, using the current spatial information (arbitrated) of the user as an input, a continuous query on a mobile device database or a cloud database by the mobile application, and return obtained data to the mobile terminal. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is queried and pushed to the user.

In an embodiment, a client registers a query with a database (in other words, a specific framework of the query is established), and sets the spatial information as a variable query condition. When the query condition changes, and the spatial information change arbitration module 1103 determines that the change meets a condition (for example, the change is large enough), middleware (for example, the continuous query module 1102 in the device-cloud platform in this embodiment of the present disclosure) is triggered to re-trigger a query. Each change triggers only one query. From a perspective of the user, a change that meets the condition triggers a query, which does not need to be triggered by the user, and seems to be continuous. This is the origin of a continuous query.

In an application scenario, a continuous query is performed: please show restaurants 1 kilometer around my location after I move by 10 kilometers. The variable query condition is "my location", and the arbitration condition of arbitration is "whether a current location is more than 10 kilometers away from a location where the query is triggered". Each time the spatial information change arbitration module 1103 determines a location change, the spatial information change arbitration module 1103 compares the location change with a previous location change, and only when a location change exceeds 10 kilometers, the location change is pushed to the continuous query module, that is, a continuous query is triggered.

Optionally, in an application scenario, it is determined that a mobile user moves by 10 kilometers, and the location change meets the trigger condition, and then a continuous query is triggered. The location change of the user is continuously tracked for a period of time or at a specific frequency, and corresponding content is pushed accordingly. For example, it is determined that the user has arrived in Xi'an, and a continuous query is triggered. Then, through the continuous query, corresponding content of a street where the user is located is pushed to the user, for example, snacks and unique scenic spots nearby.

The subsequent operation may be S106: trigger permission management, that is, receive the current spatial information of the user; and determine, based on the current spatial information, whether the user has permission to access or operate data.

There may be another subsequent operation, for example, an operation of directly triggering a mobile application to query and access data on the cloud or the terminal, and pushing information to the user based on a query result.

The subsequent triggering process is set by the mobile application developer based on a feature of a developed mobile application. A subsequent operation may alternatively be performed at a different location in the system based on a requirement, for example, may be performed on the cloud platform or the terminal.

Optionally, as shown in S107 in a dashed box in the figure, the method may further include: storing historical spatial information of the user. To be more specific, the spatial information of the user obtained each time is stored as a historical record. The information may be stored on the terminal or the cloud, or may be stored on both the terminal and the cloud. For example, the terminal stores a small amount of recent historical data, and the cloud may be used to store a large amount of historical data of the user.

The mobile application requires the current spatial information, and may require the historical spatial information of the user for increment comparison or analysis, and perform data analysis or even data mining on the historical spatial information of the user. Therefore, the storage of the historical spatial information of the user provides historical data for a mobile application that is permitted by the user for query and data mining, which enhances the value of the device-cloud collaboration platform; and facilitates determining of a complex spatial information change in S102. The historical spatial information is used to record the historical spatial data of the user. Therefore, the historical spatial information may be accordingly stored and recorded based on a historical time.

FIG. 2A is a structural diagram of a system of a device-cloud collaboration platform according to the present disclosure, and corresponds to Embodiment 2 of the present disclosure. The terminals 11, 12, and 13 are configured to obtain respective current spatial information. The spatial information herein may be positioning information of a user obtained by the terminal, or may be other information related to a user location. In addition, the spatial information of the user is synchronized to a cloud platform. In the synchronization process, the terminal may periodically obtain and send the spatial information to the cloud platform 110, or the cloud platform 110 may actively obtain the spatial information, or the user actively provides the spatial information, or there is another information synchronization manner.

The terminals each can be connected to the cloud platform through a wireless network. A mobile application developed based on the device-cloud collaboration platform in the present disclosure is installed on or can be installed on all terminals in Embodiment 2 of the present disclosure shown in FIG. 2A, and types and quantities of mobile applications installed on the terminals may be different.

The cloud platform 110 obtains system time information of each terminal, where the time information may be obtained by the cloud platform 110 from the terminal, or from the network. The cloud platform 110 further tracks a spatial information change of each terminal in the system, to obtain a spatial information change status of each terminal. There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time.

The obtaining a spatial information change may alternatively be: comparing the current spatial information of the terminal with spatial information of the terminal obtained a preset time interval ago, to obtain a spatial information change range of each target terminal. In an embodiment, for example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

The cloud platform 110 determines, based on the spatial information change status of the terminal, the time information, and spatial information-based arbitration conditions and the time information, whether to trigger a subsequent operation related to the mobile application.

The spatial information-based arbitration conditions and the arbitration condition for the time information are set by the mobile developer based on a feature of a to-be-developed mobile application. Therefore, different mobile applications may have different spatial and time arbitration conditions.

The spatial information-based arbitration conditions may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week.

Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas.

The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

When both the arbitration condition for the time information and the spatial information-based arbitration conditions are met, a subsequent operation related to the mobile application is triggered. If either of the conditions is not met, no subsequent operation is triggered.

The subsequent operation is performed based on a setting of the application developer. Therefore, subsequent operations of different mobile applications triggered after the spatial information change is arbitrated are different.

The subsequent operation may be triggering permission management: receiving the current spatial information of the user, and determining, based on the current spatial information, whether the user has permission to access or operate data. The permission may be user access permission specified by the mobile application based on a user classification, or may be user permission set by the user. The permission for data, for example, a location and a time at which the user can access or operate the data, may be set by the user on the mobile application.

The subsequent operation may be triggering a continuous query: managing, using the current spatial information of the user as an input, a continuous query on a mobile device database or a cloud database by the mobile application, and returning obtained data to the mobile terminal. Optionally, the mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is pushed to the user.

The subsequent operation may alternatively be triggering push: notifying, after the spatial information change and a time information change meet a preset condition, the mobile application of the spatial information change status of the terminal corresponding to the mobile application.

The subsequent triggering process is set by the mobile application developer based on a feature of a developed mobile application. A subsequent operation may alternatively be performed at a different location in the system based on a requirement, for example, may be performed on the cloud platform or the terminal. In addition, tracking of the spatial information change and arbitration of the spatial information change, generally, some simple change arbitration that requires a relatively small amount of data, may alternatively be performed on the terminal.

The cloud platform 110 may be further configured to store historical spatial information and time information of the user. To be more specific, the spatial information of the user obtained each time is stored with the time information as a historical record. The information may be stored on the terminal, or may be stored on both the terminal and the cloud. For example, the terminal stores a small amount of recent historical data, and the cloud may be used to store a large amount of historical data of the user. The storage of the historical spatial information and the time information of the user is an optional function of the cloud or the terminal.

The mobile application requires the current spatial information, and may require the historical spatial information of the user for increment comparison or analysis, and perform data analysis or even data mining on the historical spatial information of the user. Therefore, the storage of the historical spatial information of the user provides historical data for a mobile application that is permitted by the user for query and data mining, which enhances the value of the device-cloud collaboration platform; and facilitates determining of a complex spatial information change. The historical spatial information is used to record the historical spatial data of the user. Therefore, the historical spatial information may be accordingly stored and recorded based on a historical time.

To provide a more flexible and diversified mobile application development environment for the mobile developer, the arbitration of the spatial information change and the arbitration of the time information change may alternatively be performed on the terminal side of the device-cloud collaboration platform. The mobile application developer can flexibly set mobile application execution logic based on a requirement.

Figure 3A:
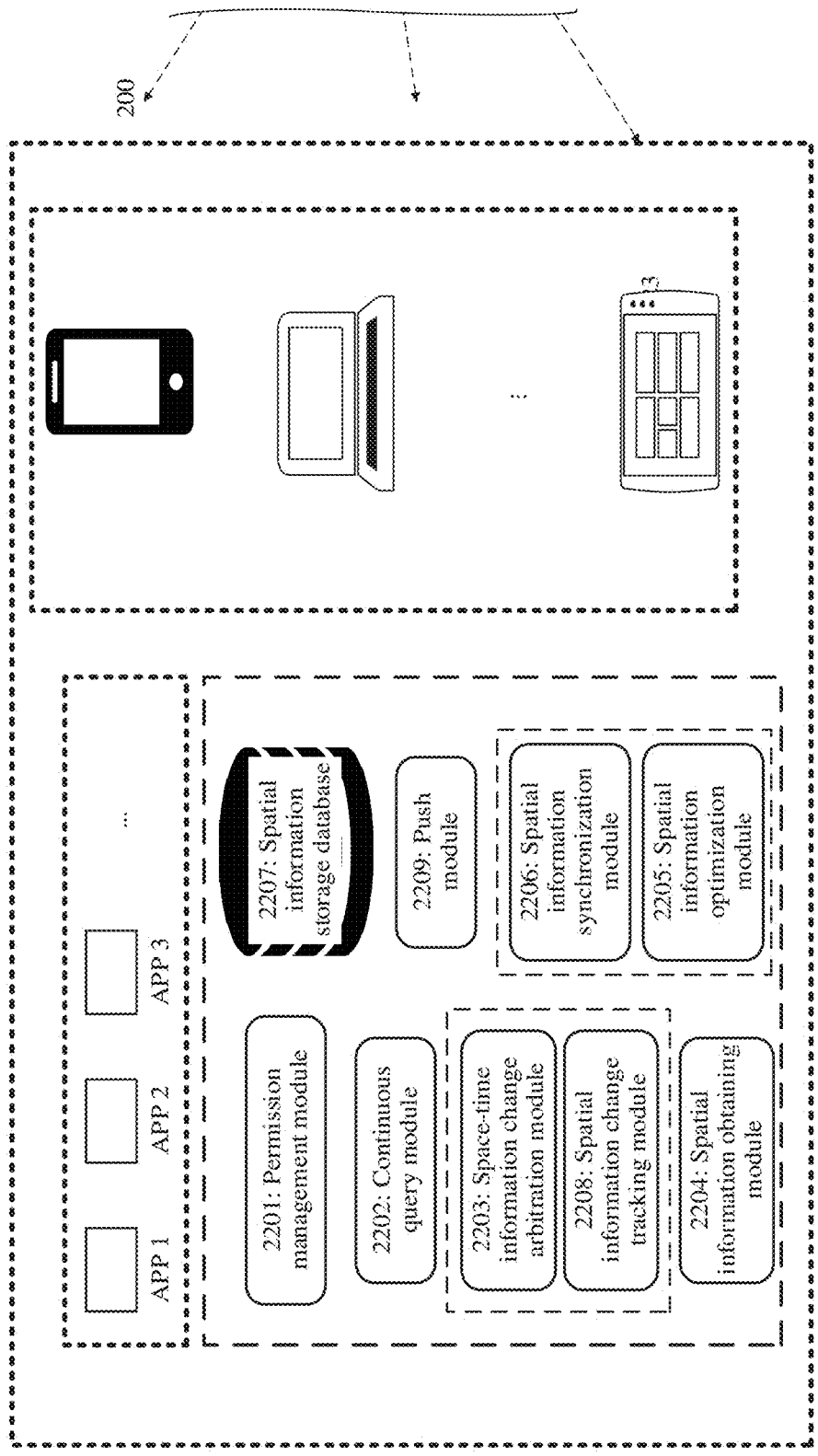
FIG. 3A and FIG. 3B are a schematic structural diagram of a device-cloud platform according to Embodiment 2 of the present disclosure.
Figure 3B:
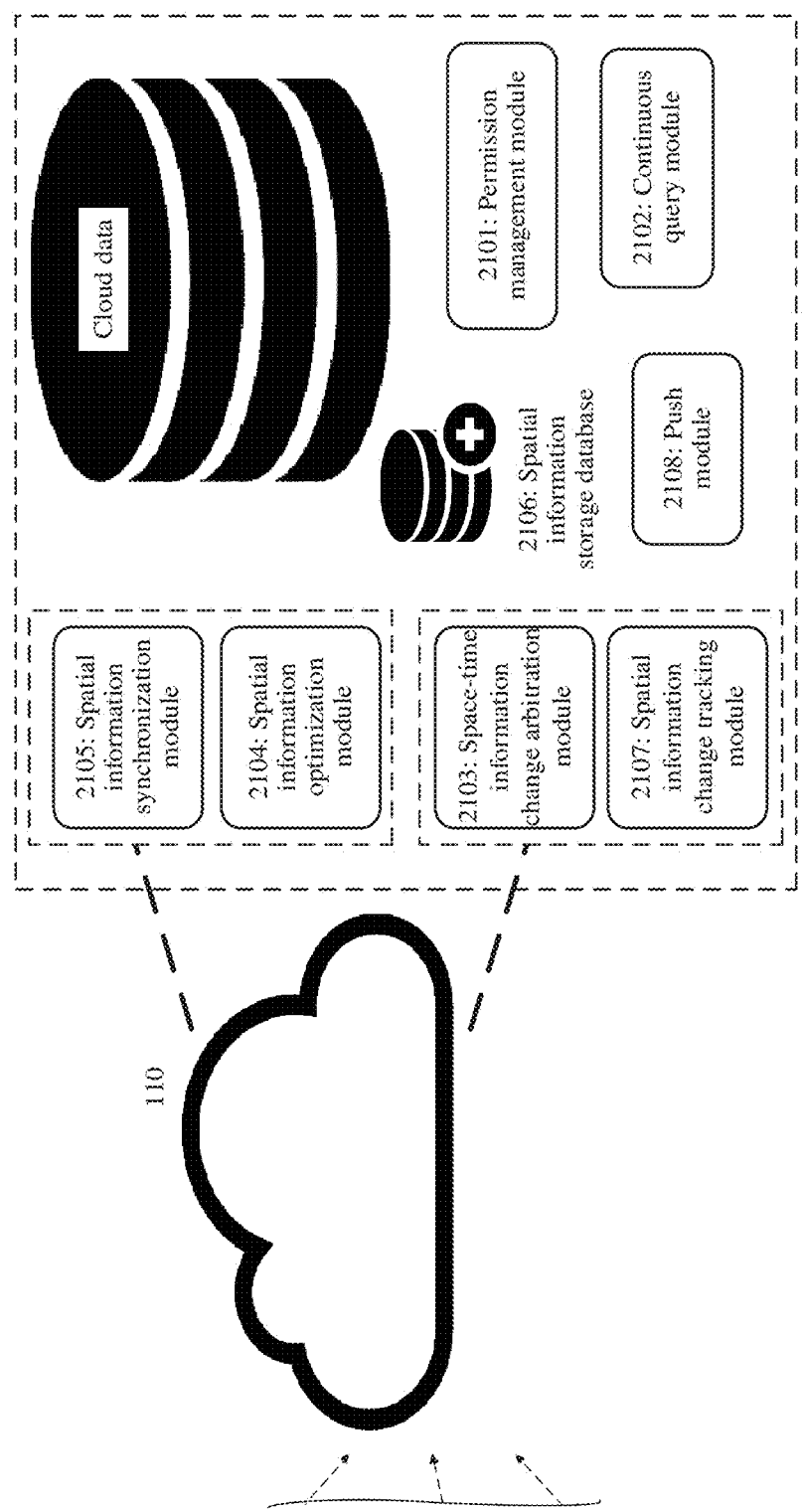

FIG. 3A and FIG. 3B are schematic structural diagrams of a device-cloud platform according to Embodiment 2 of the present disclosure. The device-cloud platform includes a terminal side 200 and a cloud platform 110. The terminal side 200 may be one or more terminal devices in different forms. The terminal side 200 and the cloud platform 110 jointly form the device-cloud platform. The terminal herein is a mobile device in various forms, including a mobile phone, a tablet computer, a PDA, a vehicle-mounted terminal, a wearable device, a smart terminal, and the like. In an embodiment, the cloud platform 110 may be implemented by a computer server or a cluster server including a plurality of servers.

A mobile application developed based on the device-cloud collaboration platform of the present disclosure is installed on or can be installed on all terminals on the terminal side 200, and types and quantities of mobile applications installed on the terminals may be different. Each terminal on the terminal side 200 is provided with a spatial information obtaining module 2204 and a spatial information synchronization module 2206. The terminal may further include: a spatial information change tracking module 2208, a space-time information change arbitration module 2203, a spatial information permission management module 2201, a continuous query module 2202, a spatial information optimization module 2206, a spatial information storage database 2207, and a push module 2209.

Modules disposed on the cloud platform 110 include: a spatial information synchronization module 2105, a spatial information change tracking module 2107, and a space-time information change arbitration module 2103. The cloud platform 110 may further include: a permission management module 2101, a spatial information storage database 2106, a continuous query module 2102, a spatial information optimization module 2104, and a push module 2108.

The functions of the modules are described as follows.

The spatial information obtaining module 2204 is configured to seamlessly introduce current spatial information of a user of the terminal into a device-cloud collaboration platform system. The spatial information may be obtained in the following manners: actively provided by the user, periodically extracted by a mobile device at a specific frequency, actively obtained by a cloud at a specific frequency, or the like. The spatial information is related to a user location, and may be longitude and latitude information, coordinate information on a map, or the like. The spatial information obtaining module 1204 is further configured to provide the obtained spatial information to another module.

The spatial information synchronization module 2206 is configured to: obtain the spatial information of the terminal from the spatial information obtaining module 2204, and synchronize spatial data of the user between the mobile device and the cloud, to maintain consistency in the spatial information between the mobile device and the cloud.

The spatial information change tracking module 2208 is configured to: receive the spatial information of the terminal sent by the spatial information obtaining module 2204 or obtain the spatial information of the terminal from the spatial information obtaining module 2204, and track a spatial information change of the mobile device based on the obtained spatial information of the terminal. There may be a plurality of manners of obtaining the spatial information change of the terminal, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

Figure 8A:
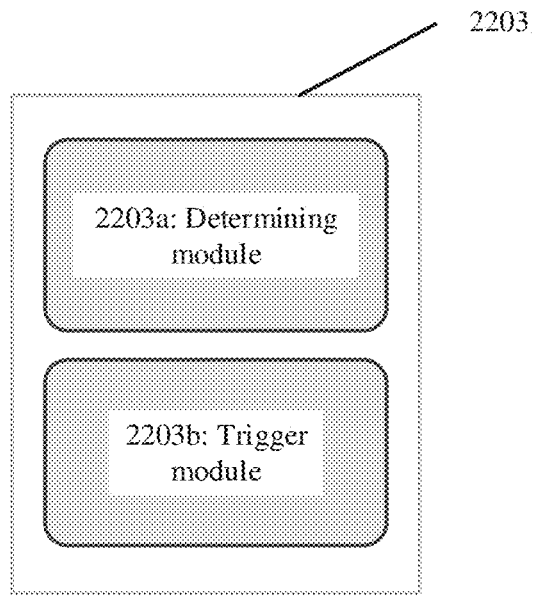
FIG. 8A is a schematic structural diagram of a space-time information change arbitration module on a terminal side according to Embodiment 2 of the present disclosure.

The space-time information change arbitration module 2203 is configured to: obtain system time information of the terminal, and determine, based on spatial information-based arbitration conditions and an arbitration condition for the time information, the spatial information change status of the terminal obtained from the spatial information change tracking module 2208, and the obtained time information, whether to trigger a subsequent operation related to the mobile application. As shown in FIG. 8A, the space-time information change arbitration module 2203 may be further divided into a determining unit 2203 and a trigger unit 2203b. The determining unit 2203a is configured to determine whether a spatial information change status of a target terminal corresponding to the target mobile application meet a spatial information-based arbitration condition preset for the target mobile application, and whether the time information meets a time information-based arbitration condition preset for the target mobile application. The trigger unit 2203b is configured to: if the determining unit 2203a determines that the two arbitration conditions are both met, trigger a subsequent operation related to the target mobile application; or if the determining unit 2203a determines that either of the arbitration conditions is not met, skip triggering a subsequent operation related to the target mobile application.

During invoking the space-time information change arbitration module 2203, the mobile developer sets the spatial information-based arbitration conditions and the arbitration condition for the time information based on a feature of a to-be-developed mobile application. Therefore, different mobile applications may have different arbitration conditions for the spatial information and different arbitration conditions for the time information. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

The subsequent operation triggered by the trigger unit 2203b is performed based on a setting of the application developer. Therefore, subsequent operations of different mobile applications triggered after the spatial information change is arbitrated are different. The subsequent operation may be triggering invoking of another module on the device-cloud platform, for example, the spatial information permission management module 2201, the continuous query module 2202, or the push module 2209; or triggering the mobile application to query data in the cloud database and push the data to the terminal; or triggering another corresponding module on the cloud, for example, the permission management module 2101, the spatial information storage database 2106, the continuous query module 2102, and the push module 2108. The space-time information change arbitration module 2203 of the mobile device is an optional module on the device-cloud platform. When the cloud is provided with the space-time information change arbitration module 2103, the terminal may not be provided with the spatial information change arbitration module 2203, and spatial information change arbitration is performed on the cloud. Alternatively, the terminal and the cloud each are provided with the spatial information change arbitration module. The space-time information change arbitration module 2203 of the terminal is configured to perform some simple change arbitration that requires a relatively small amount of data, and the space-time information change arbitration module 2103 of the cloud is configured to perform some complex change arbitration that requires a relatively large amount of computation or requires a relatively large amount of historical data. Alternatively, the terminal and the cloud each are provided with the spatial information change arbitration module. The mobile application developer selects, for invocation, either of the modules depending on a requirement. Therefore, different requirements of different mobile application developers can be met. The spatial information change tracking module 2208 is configured to provide arbitration information for the space-time information change arbitration module 2203. Therefore, the spatial information change tracking module 2208 is usually disposed together with the space-time information change arbitration module 2203. In other words, if the space-time information change arbitration module 2203 is disposed on the terminal, the spatial information change tracking module 2208 is also disposed.

The permission management module 2201 is configured to receive the current spatial information of the user, and determine, based on the current spatial information, whether the user has permission to access or operate data. The determining herein may be performed based on a setting of access permission by the application developer, for example, determine to allow access to specific data only at a specific location, allow access to specific data only in a specific time period, and allow access to data only at a specific location at a specific time. The permission may be a permission parameter set by the user. The data herein may be cloud data or application-related data. When the user does not have permission to access application data, an application cannot be triggered. The permission management module 2201 may be triggered for invocation after the space-time information change arbitration module 2203 or the space-time information change arbitration module 2103 arbitrates the spatial information change. The foregoing invocation is not an inevitable trigger step after the space-time information change arbitration module 2203 or the space-time information change arbitration module 2103 arbitrates the spatial information change, but may be flexibly performed according to requirements of different mobile application developers.

The spatial information storage database 2207: The mobile application requires the current spatial information, and may require historical spatial information of the user for increment comparison or analysis, and perform data analysis or even data mining on the historical spatial information of the user. Therefore, the spatial information storage database 2207 of the user is established on the mobile device, to provide the historical data for a mobile application that is permitted by the user for query and data mining, which enhances the value of the device-cloud collaboration platform; and to facilitate determining of a complex spatial information change of the user by the spatial information change tracking module 2208/2107. Because a storage capacity of the mobile device is limited, the spatial information storage database 2207 of the mobile device may store only a small amount of historical spatial information based on an actual requirement, to meet a requirement of processing a small amount of data on the mobile device side of the device-cloud collaboration platform. The historical spatial information is used to record the historical spatial data of the user. Therefore, the historical spatial information may be accordingly stored and recorded based on a historical time.

The continuous query module 2202 is configured to be triggered for invocation after the space-time information change arbitration module 2203 or the space-time information change arbitration module 2103 arbitrates the spatial information change. The foregoing invocation is not an inevitable trigger step after the spatial information change arbitration module 1203 or the space-time information change arbitration module 2103 arbitrates the spatial information change, but may be flexibly performed according to requirements of different mobile application developers. The continuous query module 2202 may be triggered to manage, using the current spatial information of the user as an input, a continuous query on a mobile device database or a cloud database by the mobile application, and return obtained data to the mobile terminal. The mobile application is allowed to set a trigger frequency or duration for the continuous query on the platform. The mobile application stops the continuous query when the duration is reached or a quantity of continuous queries reaches an upper limit. This provides more flexibility.

An optimized spatial information synchronization module 2205 is configured to improve, based on unique characteristics such as sequencing and continuity of the spatial information of the user, the spatial information of the user through a data synchronization technology and a consistency model on the existing device-cloud collaboration platform, in order to automatically synchronize the spatial data of the user between the mobile device and the cloud.

The push module 2209 is configured to be triggered for invocation after the space-time information change arbitration module 2203 or the space-time information change arbitration module 2103 arbitrates the spatial information change and a time information change. The foregoing invocation is not an inevitable trigger step after the space-time information change arbitration module 2203 or the space-time information change arbitration module 2103 arbitrates the spatial information change or the time information change, but may be flexibly performed according to requirements of different mobile application developers. The push module 2209 is configured to: after being triggered by the space-time information change arbitration module 2203/2103, notify a mobile application of a spatial information change status of the terminal corresponding to the mobile application. In other words, when the space-time information change arbitration module 2203 or the space-time information change arbitration module 2103 determines that the spatial information change and the time information change meet a preset condition, the push module 2209 is triggered. The push module 2209 notifies a corresponding mobile application of the spatial information change status of the terminal.

The spatial information synchronization module 2105 is configured to obtain the spatial information of the user sent by the terminal, to maintain consistency in spatial information between the cloud and the mobile device. The obtained spatial information of the user may be the spatial information of the user sent by the spatial information synchronization module 2206 of the terminal.

The spatial information change tracking module 2107 is configured to: receive the spatial information of the terminal sent by the spatial information synchronization module 2105 or obtain the spatial information of the terminal from the spatial information obtaining module 2204, and track the spatial information change of the mobile device based on the obtained spatial information of the terminal. There may be a plurality of manners for the spatial information change tracking module 2107 to track the spatial information change of the terminal, including: tracking a current spatial information change of the terminal, to obtain a location area of the terminal, for example, a city where the terminal is located, or a street where the terminal is located, and determine whether the user of the terminal is at home or at school at this time. That the spatial information change tracking module 2107 tracks the spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by the mobile application developer for obtaining the spatial information, because time intervals at which the spatial information is obtained may be different for different mobile applications. In addition to the foregoing examples, there may be another manner of obtaining the spatial information change status.

The space-time information change arbitration module 2103 is configured to obtain system time information of the terminal, and determine, based on the spatial information-based arbitration conditions and the arbitration condition for the time information, the spatial information change status of the terminal obtained from the spatial information change tracking module 2107, and the system time information of the terminal, whether to trigger a subsequent operation related to the mobile application. The time information may be obtained by the cloud platform 110 from the terminal, or from a network.

Figure 8B:
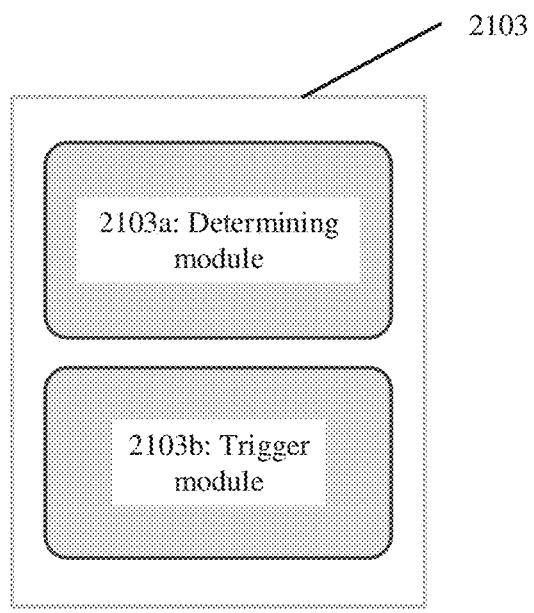
FIG. 8B is a schematic structural diagram of a space-time information change arbitration module on a cloud platform according to Embodiment 2 of the present disclosure.

As shown in FIG. 8B, the space-time information change arbitration module 2103 may be further divided into a determining unit 2103a and a trigger unit 2103b. The determining unit 1103a is configured to determine whether a spatial information change status of a target terminal corresponding to the target mobile application meet spatial information-based arbitration conditions preset for the target mobile application, and whether the time information meets an arbitration condition for the time information. The trigger unit 2103b is configured to: if the determining unit 2103a determines that the two arbitration conditions are both met, trigger a subsequent operation related to the target mobile application; or if the determining unit 2103a determines that either of the arbitration conditions is not met, skip triggering a subsequent operation related to the target mobile application.

During invoking the space-time information change arbitration module 2103, the mobile developer sets the spatial information-based arbitration conditions and the arbitration condition for the time information based on a feature of a to-be-developed mobile application. Therefore, different mobile applications may have different arbitration conditions for the spatial information. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

The subsequent operation triggered by the trigger unit 2103b is performed based on a setting of the application developer. Therefore, subsequent operations of different mobile applications triggered after the spatial information change is arbitrated are different. The subsequent operation may be triggering invoking of another module on the device-cloud platform, for example, the permission management module 2101, the spatial information storage database 2106, the continuous query module 2102, or the push module 2108; or triggering the mobile application to query data in the cloud database and push the data to the terminal; or triggering a corresponding module on the terminal, for example, the spatial information permission management module 2201, the continuous query module 2202, and the push module 2209. When the space-time information change arbitration module 2103 is disposed on the cloud, the space-time information change arbitration module 2203 may be selectively disposed on the terminal. The space-time information change arbitration module 2203 of the terminal is configured to perform some simple change arbitration that requires a relatively small amount of data, and the space-time information change arbitration module 2103 of the cloud is configured to perform some complex change arbitration that requires a relatively large amount of computation or requires a relatively large amount of historical data. Alternatively, all spatial information change arbitration may be performed on the cloud. When the cloud and the terminal are provided with the space-time information change arbitration module 2103 and the space-time information change arbitration module 2203 respectively, the mobile application developer selects, for invocation, either of the modules depending on a requirement. Therefore, different requirements of different mobile application developers can be met. The spatial information change tracking module 2107 is configured to provide arbitration information for the space-time information change arbitration module 2103. Therefore, the spatial information change tracking module 2107 is usually disposed together with the space-time information change arbitration module 2103. In other words, if the space-time information change arbitration module 2103 is disposed on the terminal, the spatial information change tracking module 2107 is also disposed.

The permission management module 2101 is configured to: receive the current spatial information of the user, and determine, based on the current spatial information, whether the user has permission to access or operate data. The spatial information may be received from the space-time information change arbitration module 2103, the spatial information change tracking module 2107, the spatial information synchronization module 2105, or another module that can provide location information of the user.

The permission determining herein may be performed based on a setting of access permission by the application developer, for example, determine to allow access to specific data only at a specific location, allow access to specific data only in a specific time period, and allow access to data only at a specific location at a specific time. The data herein may be cloud data or application-related data. When the user does not have permission to access application data, an application cannot be triggered. The permission management module 2101 may be triggered for invocation after the space-time information change arbitration module 2103 or the space-time information change arbitration module 2203 arbitrates the spatial information change. The foregoing invocation is not an inevitable trigger step after the space-time information change arbitration module 2103 or the space-time information change arbitration module 2203 arbitrates the spatial information change, but may be flexibly performed according to requirements of different mobile application developers.

The spatial information storage database 2106: The mobile application requires the current spatial information, and may require the historical spatial information of the user for increment comparison or analysis, and perform data analysis or even data mining on the historical spatial information of the user. Therefore, the spatial information storage database 2106 of the cloud needs to be established, to provide the historical data for a mobile application that is permitted by the user for query and data mining, which enhances the value of the device-cloud collaboration platform; and to facilitate determining of a complex spatial information change of the user by the spatial information change tracking module 2208/2107. The historical spatial information is used to record the historical spatial data of the user. Therefore, the historical spatial information may be accordingly stored and recorded based on a historical time.

The continuous query module 2102 is configured to be triggered for invocation after the space-time information change arbitration module 2103 or the space-time information change arbitration module 2203 arbitrates the spatial information change and the time information change. The foregoing invocation is not an inevitable trigger step after the space-time information change arbitration module 2103 or the space-time information change arbitration module 2203 arbitrates the spatial information change, but may be flexibly performed according to requirements of different mobile application developers. The continuous query module 2102 may be triggered to manage, using the current spatial information (arbitrated) of the user as an input, a continuous query on the mobile device database or the cloud database by the mobile application, and return obtained data to the mobile terminal, where the spatial information may be from the space-time information change arbitration module 2103, the spatial information change tracking module 2107, the spatial information synchronization module 2105, or another module that can provide the location information of the user. The mobile application is allowed to set a trigger frequency or duration for the continuous query on the platform. The mobile application stops the continuous query when the duration is reached or a quantity of continuous queries reaches an upper limit. This allows more flexible mobile application development.

In an embodiment, a client registers a query with a database (In other words, a specific framework of the query is established), and sets the spatial information as a variable query condition. When the query condition changes, and the spatial information change arbitration module 1103 determines that the change meets a condition (for example, the change is large enough), middleware (for example, the continuous query module 1102 in the device-cloud platform in this embodiment of the present disclosure) is triggered to re-trigger a query. Each change triggers only one query. From a perspective of the user, a change that meets the condition triggers a query, which does not need to be triggered by the user, and seems to be continuous. This is the origin of a continuous query.

In an application scenario, a continuous query is performed: please show restaurants 1 kilometer around my location after I move by 10 kilometers. The variable query condition is "my location", and the arbitration condition of arbitration is "whether a current location is more than 10 kilometers away from a location where the query is triggered". Each time the spatial information change arbitration module 1103 determines a location change, the spatial information change arbitration module 1103 compares the location change with a previous location change, and only when a location change exceeds 10 kilometers, the location change is pushed to the continuous query module, that is, a continuous query is triggered.

Optionally, in an application scenario, it is determined that a mobile user moves by 10 kilometers, and the location change meets the trigger condition, and then a continuous query is triggered. The location change of the user is continuously tracked for a period of time or at a specific frequency, and corresponding content is pushed accordingly. For example, it is determined that the user has arrived in Xi'an, and a continuous query is triggered. Then, through the continuous query, corresponding content of a street where the user is located is pushed to the user, for example, snacks and unique scenic spots nearby.

The optimized spatial information synchronization module 2104 is configured to improve, based on unique characteristics such as sequencing and continuity of the spatial information of the user, the spatial information of the user through a data synchronization technology and a consistency model on the existing device-cloud collaboration platform, in order to automatically synchronize the spatial data of the user between the mobile device and the cloud.

The push module 2108 is configured to be triggered for invocation after the space-time information change arbitration module 2103 or the space-time information change arbitration module 2203 arbitrates the spatial information change and the time information change. The foregoing invocation is not an inevitable trigger step after the space-time information change arbitration module 2103 or the space-time information change arbitration module 2203 arbitrates the spatial information change, but may be flexibly performed according to requirements of different mobile application developers. The push module 2108 is configured to: after being triggered by the spatial information change arbitration module, notify a mobile application of a spatial information change status of the terminal corresponding to the mobile application. In other words, when the space-time information change arbitration module 2103 or the space-time information change arbitration module 2203 determines that the spatial information change meets a preset condition, the push module 2108 is triggered. The push module 1108 notifies a corresponding mobile application of the spatial information change status of the terminal.

It should be noted that, an objective of the foregoing embodiment of the present disclosure is to provide a device-cloud collaboration platform, in order to provide native support for the mobile application developer in terms of spatial information of a user, and provide related modules for the spatial information of the user. When a specific mobile application is deployed on the platform, these modules are selectively invoked according to a specific requirement of the application developer, to form a unique data path. Therefore, when designing the device-cloud platform, some or all of the foregoing modules can be deployed depending on performance of the device-cloud platform or a type of a served application developer. For flexibility of application development, some modules may be deployed on both the mobile device and the cloud, or deployed only on the cloud or only on the terminal.

Figure 9:
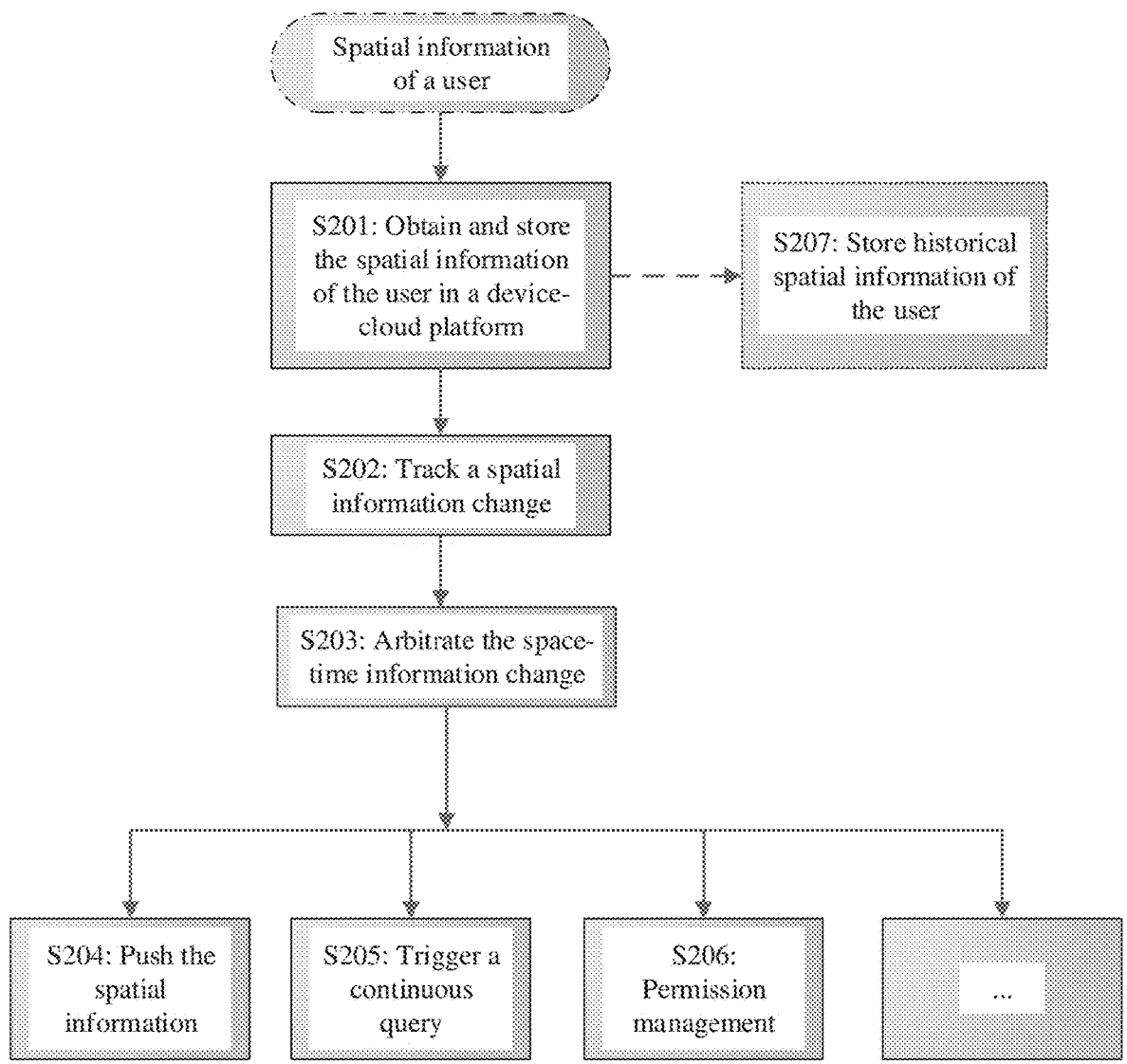
FIG. 9 is a flowchart of a method according to Embodiment 2 of the present disclosure.

FIG. 9 is a flowchart of a method according to Embodiment 2 of the present disclosure. The method according to Embodiment 2 of the present disclosure is shown as follows.

S201: Obtain current spatial information of each terminal in a system. The spatial information herein may be positioning information of a user obtained by the terminal, or may be other information related to a user location.

The spatial information of the user is obtained by a device-cloud platform. To be more specific, the terminal obtains the spatial information of the user, optimizes the spatial information, and synchronizes optimized spatial information to a cloud. Alternatively, the terminal directly synchronizes the spatial information of the user to a cloud platform after obtaining the spatial information. In a process of obtaining the spatial information, the terminal may periodically obtain and synchronize the spatial information, or the cloud actively obtains the spatial information, or the user actively provides the spatial information, or there is another manner of obtaining the spatial information.

S202: Track a spatial information change of each terminal in the system, to obtain a spatial information change status of each terminal.

There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status. S102 may be performed on the cloud, or may be performed on the terminal.

S203: Obtain system time information of the terminal, and determine, based on the spatial information change status of the terminal, the system time information of the terminal, and spatial information-based arbitration conditions, whether to trigger a subsequent operation related to the mobile application. When both an arbitration condition for the time information and the spatial information-based arbitration conditions are met, a subsequent operation related to the mobile application is triggered. If either of the conditions is not met, no subsequent operation is triggered. The time information may be obtained by the cloud platform from the terminal, or from a network.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined. S203 may be performed on the cloud, or may be performed on the terminal.

The subsequent operation is performed based on a setting of the application developer. Therefore, subsequent operations of different mobile applications triggered after the spatial information change is arbitrated may be different.

The subsequent operation may be S204: push the spatial information, that is, notify, after the spatial information change and a time information change meet a preset condition, the mobile application of the spatial information change status of the terminal corresponding to the mobile application.

The subsequent operation may be S205: trigger a continuous query, that is, manage, using the current spatial information (arbitrated) of the user as an input, a continuous query on a mobile device database or a cloud database by the mobile application, and return obtained data to the mobile terminal. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is queried and pushed to the user.

In an embodiment, a client registers a query with a database (In other words, a specific framework of the query is established), and sets the spatial information as a variable query condition. When the query condition changes, and the spatial information change arbitration module 1103 determines that the change meets a condition (for example, the change is large enough), middleware (for example, the continuous query module 1102 in the device-cloud platform in this embodiment of the present disclosure) is triggered to re-trigger a query. Each change triggers only one query. From a perspective of the user, a change that meets the condition triggers a query, which does not need to be triggered by the user, and seems to be continuous. This is the origin of a continuous query.

In an application scenario, a continuous query is performed: please show restaurants 1 kilometer around my location after I move by 10 kilometers. The variable query condition is "my location", and the arbitration condition of arbitration is "whether a current location is more than 10 kilometers away from a location where the query is triggered". Each time the spatial information change arbitration module 1103 determines a location change, the spatial information change arbitration module 1103 compares the location change with a previous location change, and only when a location change exceeds 10 kilometers, the location change is pushed to the continuous query module, that is, a continuous query is triggered.

Optionally, in an application scenario, it is determined that a mobile user moves by 10 kilometers, and the location change meets the trigger condition, and then a continuous query is triggered. The location change of the user is continuously tracked for a period of time or at a specific frequency, and corresponding content is pushed accordingly. For example, it is determined that the user has arrived in Xi'an, and a continuous query is triggered. Then, through the continuous query, corresponding content of a street where the user is located is pushed to the user, for example, snacks and unique scenic spots nearby.

The subsequent operation may be S206: trigger permission management, that is, receive the current spatial information of the user; and determine, based on the current spatial information, whether the user has permission to access or operate data.

The permission determining herein may be performed based on a setting of access permission by the application developer, for example, determine to allow access to specific data only at a specific location, allow access to specific data only in a specific time period, and allow access to data only at a specific location at a specific time. The data herein may be cloud data or application-related data. When the user does not have permission to access application data, an application cannot be triggered.

There may be another subsequent operation, for example, an operation of directly triggering a mobile application to query and access data on the cloud or the terminal, and pushing information to the user based on a query result.

The subsequent triggering process is set by the mobile application developer based on a feature of a developed mobile application. A subsequent operation may alternatively be performed at a different location in the system based on a requirement, for example, may be performed on the cloud platform or the terminal.

Optionally, as shown in S207 in a dashed box in the figure, the method may further include: storing historical spatial information of the user. To be more specific, the spatial information of the user obtained each time is stored as a historical record. The information may be stored on the terminal or the cloud, or may be stored on both the terminal and the cloud. For example, the terminal stores a small amount of recent historical data, and the cloud may be used to store a large amount of historical data of the user.

The mobile application requires the current spatial information, and may require the historical spatial information of the user for increment comparison or analysis, and perform data analysis or even data mining on the historical spatial information of the user. Therefore, the storage of the historical spatial information of the user provides historical data for a mobile application that is permitted by the user for query and data mining, which enhances the value of the device-cloud collaboration platform; and facilitates determining of a complex spatial information change in S202. The historical spatial information is used to record the historical spatial data of the user. Therefore, the historical spatial information may be accordingly stored and recorded based on a historical time.

Figure 6:
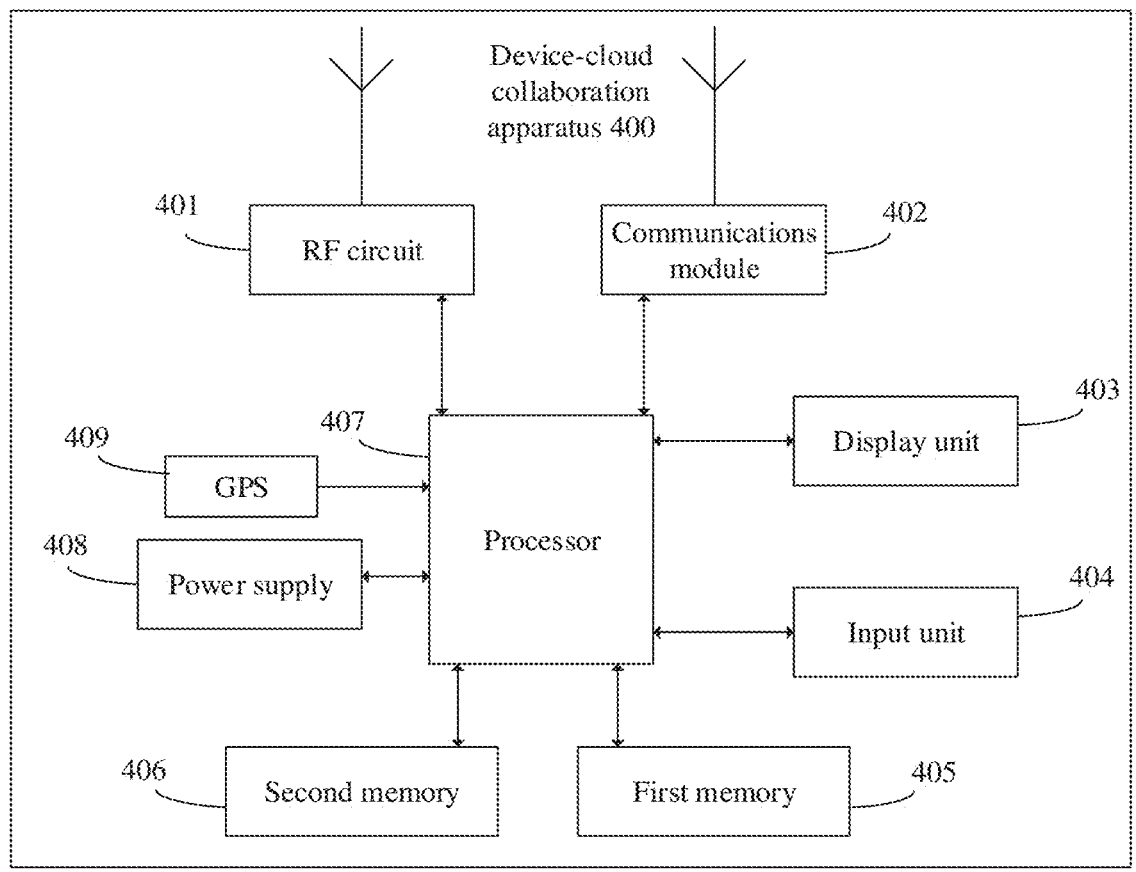
FIG. 6 is a schematic structural diagram of a device-cloud collaboration apparatus according to an embodiment of the present disclosure.

FIG. 6 is a structural diagram of a device-cloud collaboration apparatus 400 according to Embodiment 1 and Embodiment 2 of the present disclosure. The apparatus 400 is a mobile terminal in various forms, including a mobile phone, a tablet computer, a PDA, a vehicle-mounted terminal, a wearable device, a smart terminal, and the like. The apparatus 400 includes hardware modules such as an RF circuit 401, a Wi-Fi module 402, a display unit 403, an input unit 404, a first memory 405, a second memory 406, a processor 407, a power supply 408, and a GPS module 409.

The RF circuit 401 is configured to send and receive a communication signal, and can exchange data and synchronize spatial information with a cloud platform through a wireless network. The RF circuit 401 obtains the spatial information of a user via a base station, and sends the spatial information of the user to the cloud platform.

The communications module 402 may be a Wi-Fi module, and is configured to communicatively interconnect with the cloud platform through a Wi-Fi connection network, and learn location information of the user via an AP. The communications module 402 may be a Bluetooth module configured to perform Bluetooth positioning. Alternatively, the communications module 402 may be another short-distance wireless communications module. The location information of the user may be sent by the communications module 402 to the cloud platform.

The display unit 1203 is configured to display a user interaction interface. The user may access a mobile application through a display interface. The current spatial information of the user may be actively obtained by the mobile application or may be manually entered by the user. The display unit 403 may include a display panel. Optionally, the display panel may be in a form of a liquid crystal display (LCD), or an organic light-emitting diode (OLED), or the like. During implementation, a touch panel covers the display panel to form a touch display screen, and the processor 407 provides a corresponding visual output on the touch display screen based on a type of a touch instruction. In this embodiment of the present disclosure, the input unit 404 may include a touch panel, which is also referred to as a touchscreen, and the touch panel may collect a touch operation (for example, the user performs an operation on the touch panel using any appropriate object or accessory such as a finger or a stylus) of the user on or near the touch panel. The touch panel may be implemented in a plurality of types, such as a resistive type, a capacitive type, an infrared type, and a surface acoustic wave type. The input unit 404 includes the touch panel, and may further include other input devices, including but not limited to one or more of a physical keyboard, a function key (for example, a volume control key or an on/off key), a trackball, a mouse, a joystick, and the like.

The first memory 405 stores information about a preset quantity of applications (APPs) and interface information of the apparatus. It may be understood that the second memory 406 may be external storage of the device-cloud collaboration apparatus 400, and the first memory 405 may be a memory of the smart apparatus. The first memory 405 may be one of a non-volatile random-access memory (NVRAM), a dynamic random access memory (DRAM), a static random access memory (SRAM), a flash memory, and the like. An operating system running on the smart apparatus is usually installed on the first memory 405. The second memory 406 may be a hard disk, an optical disc, a universal serial bus (USB) flash drive, a floppy disk or a tape drive, a cloud server, or the like. Optionally, currently some third-party APPs may alternatively be installed on the second memory 406. In Embodiment 1 and Embodiment 2 of the present disclosure, a program of the terminal part on the device-cloud collaboration platform may be stored in the first memory 405, or may be stored in the second memory 406.

The processor 407 is a control center of the apparatus, connects all parts of the entire apparatus through various interfaces and cables, and executes various functions of the apparatus and processes data by running or executing a software program and/or a module stored in the first memory 405 and invoking data stored in the second memory 406. Optionally, the processor 407 may include one or more processing units.

The power supply 408 may supply power to the entire apparatus, and includes lithium batteries in various models.

The GPS module 409 is configured to obtain the spatial information of the apparatus, for example, a location coordinate.

When a program in the first memory 405 or the second memory 406 receives an instruction of the processor, the following steps are performed.

1. Obtain current spatial information of the apparatus. The spatial information herein may be positioning information of the user obtained by the apparatus, or may be other information related to a user location. The apparatus optimizes the spatial information after obtaining the spatial information, and synchronizes optimized spatial information to a cloud. Alternatively, the apparatus directly synchronizes the spatial information of the user to the cloud platform after obtaining the spatial information. In a process of obtaining the spatial information, the apparatus may periodically obtain and send the spatial information, or the apparatus obtains the spatial information after receiving an instruction from the cloud platform, or the user actively provides the spatial information, or there is another manner of obtaining the spatial information.

2. Track a spatial information change of the apparatus, to obtain a spatial information change status of the apparatus.

There may be a plurality of manners of obtaining the spatial information change status, including: tracking a current spatial information change of the apparatus, to obtain a location area of the apparatus, for example, a city where the apparatus is located, or a street where the apparatus is located, and determine whether the user of the apparatus is at home or at school at this time. The obtaining a spatial information change may alternatively be: comparing the current spatial information of the apparatus with spatial information of the apparatus obtained a preset time interval ago, to obtain a spatial information change range of each target apparatus. For example, the apparatus is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

3. Determine, based on spatial information-based arbitration conditions and the spatial information change status of the apparatus, whether to trigger a subsequent operation related to a mobile application.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the apparatus is in one of the preset location areas is determined based on the obtained spatial information. If the apparatus is in one of the preset location areas, a corresponding subsequent operation is performed. The preset location area is set by the mobile application developer during application development based on a development requirement for the mobile application, and there may be one or more preset location areas.

The foregoing steps have been described in detail in the foregoing method embodiment. Detailed implementation of each step in the method embodiment is also applicable to this, and details are not described herein again.

The subsequent operation is performed based on a setting of the application developer. Therefore, subsequent operations of different mobile applications triggered after the spatial information change is arbitrated are different. The subsequent operations may be as follows.

4a. Push the spatial information, that is, notify, after the spatial information change meets a preset condition, the mobile application of the spatial information change status of the apparatus corresponding to the mobile application.

4b. Trigger a continuous query, that is, manage, using the current spatial information (arbitrated) of the user as an input, a continuous query on a mobile device database or a cloud database by the mobile application, and return obtained data to the mobile apparatus. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the apparatus is in a preset scenic spot, a current location of the apparatus is obtained every 10 minutes within a specific period of time, and information about a scenic spot near the apparatus is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the apparatus, and pushing information to the user based on a query result.

The apparatus may further be disposed in the second memory 405 based on a design requirement of the device-cloud collaboration platform, to store historical spatial information of the user.

When a program in the first memory 1205 or in the second memory 406 receives an instruction of the processor, the following steps are alternatively performed.

1. Obtain current spatial information of the apparatus. The spatial information herein may be positioning information of the user obtained by the apparatus, or may be other information related to a user location. The apparatus optimizes the spatial information after obtaining the spatial information, and synchronizes optimized spatial information to a cloud. Alternatively, the apparatus directly synchronizes the spatial information of the user to the cloud platform after obtaining the spatial information. In a process of obtaining the spatial information, the apparatus may periodically obtain and send the spatial information, or the apparatus obtains the spatial information after receiving an instruction from the cloud platform, or the user actively provides the spatial information, or there is another manner of obtaining the spatial information.

2. Track a spatial information change of the apparatus, to obtain a spatial information change status of the apparatus.

There may be a plurality of manners of obtaining the spatial information change status, including: tracking a current spatial information change of the apparatus, to obtain a location area of the apparatus, for example, a city where the apparatus is located, or a street where the apparatus is located, and determine whether the user of the apparatus is at home or at school at this time. The obtaining a spatial information change may alternatively be: comparing the current spatial information of the apparatus with spatial information of the apparatus obtained a preset time interval ago, to obtain a spatial information change range of each target apparatus. For example, the apparatus is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

3. Obtain system time information of the apparatus, and determine, based on spatial information-based arbitration conditions, an arbitration condition for the time information, the spatial information change status of the apparatus, and the time information, whether to trigger a subsequent operation related to a mobile application.

The spatial information-based arbitration conditions and the arbitration condition for the time information are set by the mobile developer based on a feature of a to-be-developed mobile application. Therefore, different mobile applications may have different arbitration conditions for the spatial information and different arbitration conditions for the time information. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the apparatus is in one of the preset location areas is determined based on the obtained spatial information. If the apparatus is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

The foregoing steps have been described in detail in the foregoing method embodiment. Detailed implementation of each step in the method embodiment is also applicable to this, and details are not described herein again.

The subsequent operation is performed based on a setting of the application developer. Therefore, subsequent operations of different mobile applications triggered after the spatial information change is arbitrated are different. The subsequent operations may be as follows.

4a. Push the spatial information, that is, notify, after the spatial information change and a time information change meet a preset condition, the mobile application of the spatial information change status of the apparatus corresponding to the mobile application.

4b. Trigger a continuous query, that is, manage, using the current spatial information (arbitrated) of the user as an input, a continuous query on a mobile device database or a cloud database by the mobile application, and return obtained data to the mobile apparatus. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the apparatus is in a preset scenic spot, a current location of the apparatus is obtained every 10 minutes within a specific period of time, and information about a scenic spot near the apparatus is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the apparatus, and pushing information to the user based on a query result.

The apparatus may further be disposed in the second memory 405 based on a design requirement of the device-cloud collaboration platform, to store historical spatial information of the user.

The foregoing steps have been described in detail in the foregoing method embodiment. Detailed implementation of each step in the method embodiment is also applicable to this. Details are not described herein again.

Figure 12:
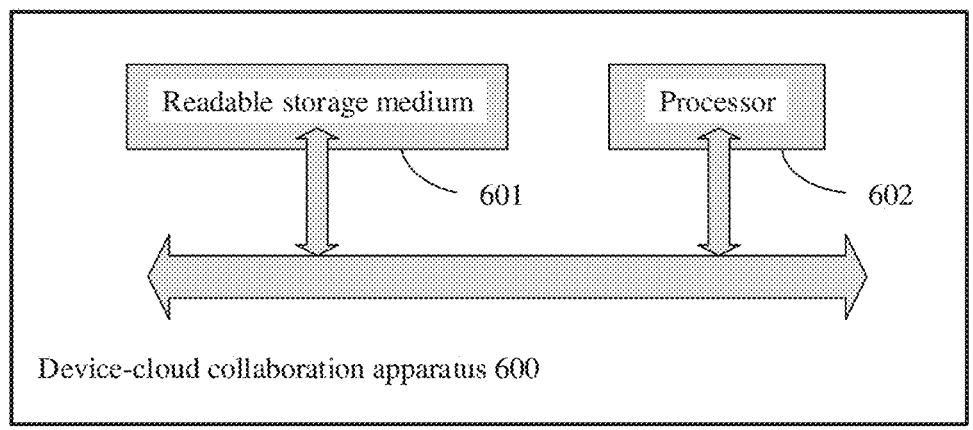
FIG. 12 is another schematic structural diagram of a device-cloud collaboration apparatus according to an embodiment of the present disclosure.

FIG. 12 is a structural diagram of another device-cloud collaboration apparatus according to Embodiment 1 and Embodiment 2 of the present disclosure.

The apparatus 600 may be a chip, or may be a data processing apparatus in another form. The apparatus 600 includes a readable storage medium 601 and a processor 602.

The readable storage medium 601 may be configured to store various program packets of the device-cloud collaboration platform. In Embodiment 1 and Embodiment 2 of the present disclosure, a program of the terminal part on the device-cloud collaboration platform may be stored in the first memory 405, or may be stored in the second memory 406.

The processor 602 is a control center of the apparatus, connects all parts of the entire apparatus through various interfaces and cables, and executes various functions of the apparatus and processes data by running or executing a software program and/or a module stored in the readable storage medium 601. Optionally, the processor 602 may include one or more processing units.

When a program in the readable storage medium 601 receives an instruction of the processor, the following steps are performed.

1. Obtain current spatial information of the apparatus. The spatial information herein may be positioning information of a user obtained by the apparatus, or may be other information related to a user location. The apparatus optimizes the spatial information after obtaining the spatial information, and synchronizes optimized spatial information to a cloud. Alternatively, the apparatus directly synchronizes the spatial information of the user to the cloud platform after obtaining the spatial information. In a process of obtaining the spatial information, the apparatus may periodically obtain and send the spatial information, or the apparatus obtains the spatial information after receiving an instruction from the cloud platform, or the user actively provides the spatial information, or there is another manner of obtaining the spatial information.

2. Track a spatial information change of the apparatus, to obtain a spatial information change status of the apparatus.

There may be a plurality of manners of obtaining the spatial information change status, including: tracking a current spatial information change of the apparatus, to obtain a location area of the apparatus, for example, a city where the apparatus is located, or a street where the apparatus is located, and determine whether the user of the apparatus is at home or at school at this time. The obtaining a spatial information change may alternatively be: comparing the current spatial information of the apparatus with spatial information of the apparatus obtained a preset time interval ago, to obtain a spatial information change range of each target apparatus. For example, the apparatus is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

3. Determine, based on spatial information-based arbitration conditions and the spatial information change status of the apparatus, whether to trigger a subsequent operation related to a mobile application.

The spatial information-based arbitration conditions are by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the apparatus is in one of the preset location areas is determined based on the obtained spatial information. If the apparatus is in one of the preset location areas, a corresponding subsequent operation is performed. The preset location area is set by the mobile application developer during application development based on a development requirement for the mobile application, and there may be one or more preset location areas.

The foregoing steps have been described in detail in the foregoing method embodiment. Detailed implementation of each step in the method embodiment is also applicable to this. Details are not described herein again.

The subsequent operation is performed based on a setting of the application developer. Therefore, subsequent operations of different mobile applications triggered after the spatial information change is arbitrated are different. The subsequent operations may be as follows.

4a. Push the spatial information, that is, notify, after the spatial information change meets a preset condition, the mobile application of the spatial information change status of the apparatus corresponding to the mobile application.

4b. Trigger a continuous query, that is, manage, using the current spatial information (arbitrated) of the user as an input, a continuous query on a mobile device database or a cloud database by the mobile application, and return obtained data to the mobile apparatus. The mobile application is allowed to set a trigger frequency or duration for the continuous query on a system. The mobile application stops the continuous query when the duration is reached or a quantity of continuous queries reaches an upper limit. This allows more flexible mobile application development. For example, when it is determined that the apparatus is in a preset scenic spot, a current location of the apparatus is obtained every 10 minutes within a specific period of time, and information about a scenic spot near the apparatus is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the apparatus, and pushing information to the user based on a query result.

The apparatus may further be disposed in the second memory 405 based on a design requirement of the device-cloud collaboration platform, to store historical spatial information of the user.

When a program in the readable storage medium 601 receives an instruction of the processor, the following steps are alternatively performed.

1. Obtain current spatial information of the apparatus. The spatial information herein may be positioning information of a user obtained by the apparatus, or may be other information related to a user location. The apparatus optimizes the spatial information after obtaining the spatial information, and synchronizes optimized spatial information to a cloud. Alternatively, the apparatus directly synchronizes the spatial information of the user to the cloud platform after obtaining the spatial information. In a process of obtaining the spatial information, the apparatus may periodically obtain and send the spatial information, or the apparatus obtains the spatial information after receiving an instruction from the cloud platform, or the user actively provides the spatial information, or there is another manner of obtaining the spatial information.

2. Track a spatial information change of the apparatus, to obtain a spatial information change status of the apparatus.

There may be a plurality of manners of obtaining the spatial information change status, including: tracking a current spatial information change of the apparatus, to obtain a location area of the apparatus, for example, a city where the apparatus is located, or a street where the apparatus is located, and determine whether the user of the apparatus is at home or at school at this time. The obtaining a spatial information change may alternatively be: comparing the current spatial information of the apparatus with spatial information of the apparatus obtained a preset time interval ago, to obtain a spatial information change range of each target apparatus. For example, the apparatus is 5 kilometers away from a location the preset time interval ago. The preset time interval is an interval specified by a mobile application developer for obtaining the spatial information, because time intervals at which the spatial information is obtained may be different for different mobile applications.

In addition to the foregoing examples, there may be another manner of obtaining the spatial information change status.

3. Obtain system time information of the apparatus, and determine, based on spatial information-based arbitration conditions, an arbitration condition for the time information, the spatial information change status of the apparatus, and the time information, whether to trigger a subsequent operation related to a mobile application.

The spatial information-based arbitration conditions and the arbitration condition for the time information are set by the mobile developer based on a feature of a to-be-developed mobile application. Therefore, different mobile applications may have different arbitration conditions for the spatial information and different arbitration conditions for the time information. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the apparatus is in one of the preset location areas is determined based on the obtained spatial information. If the apparatus is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

The foregoing steps have been described in detail in the foregoing method embodiment. Detailed implementation of each step in the method embodiment is also applicable to this. Details are not described herein again.

The subsequent operation is performed based on a setting of the application developer. Therefore, subsequent operations of different mobile applications triggered after the spatial information change is arbitrated are different. The subsequent operations may be as follows.

4a. Push the spatial information, that is, notify, after the spatial information change and a time information change meet a preset condition, the mobile application of the spatial information change status of the apparatus corresponding to the mobile application.

4b. Trigger a continuous query, that is, manage, using the current spatial information (arbitrated) of the user as an input, a continuous query on a mobile device database or a cloud database by the mobile application, and return obtained data to the mobile apparatus. The mobile application is allowed to set a trigger frequency or duration for the continuous query on a system. The mobile application stops the continuous query when the duration is reached or a quantity of continuous queries reaches an upper limit. This allows more flexible mobile application development. For example, when it is determined that the apparatus is in a preset scenic spot, a current location of the apparatus is obtained every 10 minutes within a specific period of time, and information about a scenic spot near the apparatus is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the apparatus, and pushing information to the user based on a query result.

The apparatus may further be disposed in the second memory 405 based on a design requirement of the device-cloud collaboration platform, to store historical spatial information of the user.

The foregoing steps have been described in detail in the foregoing method embodiment. Detailed implementation of each step in the method embodiment is also applicable to this. Details are not described herein again.

Figure 7:
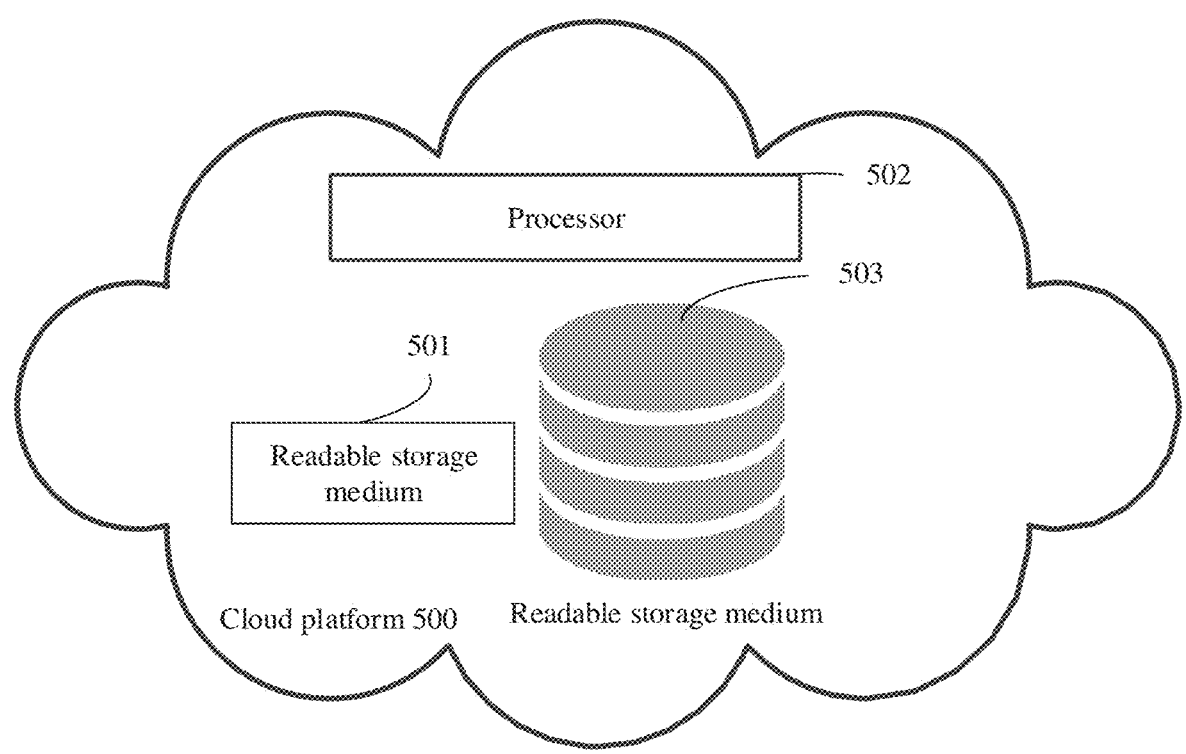
FIG. 7 is a schematic structural diagram of a cloud platform according to an embodiment of the present disclosure.

FIG. 7 is a structural diagram of a cloud platform according to Embodiment 1 and Embodiment 2 of the present disclosure. The cloud platform 500 includes a readable storage medium 501, a processor 502, and a database 503.

In Embodiment 1 and Embodiment 2 of the present disclosure, a program of a cloud part in a device-cloud collaboration system may be stored in the readable storage medium 501.

The processor 502 processes data on the cloud platform by running or executing a software program and/or a module stored in the readable storage medium 501. Optionally, the processor 501 may include one or more processing units.

When a program in the readable storage medium 501 receives an instruction of the processor 502, the following steps are performed.

1. Obtain current spatial information of each terminal in the system. The spatial information herein may be positioning information of a user obtained by the terminal, or may be other information related to a user location.

In a process of obtaining the spatial information, the terminal may periodically obtain and synchronize the spatial information to the cloud, or the cloud actively obtains the spatial information at a specific frequency, or the user actively provides the spatial information, or there is another manner of obtaining the spatial information.

2. Track a spatial information change of each terminal in the system, to obtain a spatial information change status of each terminal.

There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

3. Determine, based on spatial information-based arbitration conditions and the spatial information change status of the terminal, whether to trigger a subsequent operation related to a mobile application.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas.

The foregoing steps have been described in detail in the foregoing method embodiment. Detailed implementation of each step in the method embodiment is also applicable to this. Details are not described herein again.

The subsequent operation is performed based on a setting of the application developer. Therefore, subsequent operations of different mobile applications triggered after the spatial information change is arbitrated are different. The following operations may be triggered.

4a. Push the spatial information, that is, notify, after the spatial information change meets a preset condition, the mobile application of the spatial information change status of the terminal corresponding to the mobile application.

4b. Trigger a continuous query, that is, manage, using the current spatial information (arbitrated) of the user as an input, a continuous query on a mobile device database or a cloud database by the mobile application, and return obtained data to the mobile terminal. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the terminal, and pushing information to the user based on a query result.

The cloud platform may further store, based on a design requirement of the platform, historical spatial information of the user in the database 503 on the cloud platform. To be more specific, the spatial information of the user obtained each time is stored as a historical record.

The foregoing steps have been described in detail in the foregoing method embodiment. Detailed implementation of each step in the method embodiment is also applicable to this, and details are not described herein again.

Optionally, in another embodiment, a program in the readable storage medium 501 receives an instruction of the processor 502, and the following steps are alternatively performed.

1. Obtain current spatial information of each terminal in the system. The spatial information herein may be positioning information of a user obtained by the terminal, or may be other information related to a user location.

In a process of obtaining the spatial information, the terminal may periodically obtain and synchronize the spatial information to the cloud, or the cloud actively obtains the spatial information at a specific frequency, or the user actively provides the spatial information, or there is another manner of obtaining the spatial information.

2. Track a spatial information change of each terminal in the system, to obtain a spatial information change status of each terminal.

There may be a plurality of manners of obtaining the spatial information change status, including: tracking a current spatial information change of the terminal, to obtain a location area of the terminal, for example, a city where the terminal is located, or a street where the terminal is located, and determine whether the user of the terminal is at home or at school at this time. The obtaining a spatial information change may alternatively be: comparing the current spatial information of the terminal with spatial information of the terminal obtained a preset time interval ago, to obtain a spatial information change range of each target terminal. For example, the terminal is 5 kilometers away from a location the preset time interval ago. The preset time interval is an interval specified by a mobile application developer for obtaining the spatial information, because time intervals at which the spatial information is obtained may be different for different mobile applications. In addition to the foregoing examples, there may be another manner of obtaining the spatial information change status.

3. Obtain system time information of the terminal, and determine, based on spatial information-based arbitration conditions and an arbitration condition for the time information, the spatial information change status of the terminal, and the time information of the terminal, whether to trigger a subsequent operation related to a mobile application.

The spatial information-based arbitration conditions are set by the mobile developer based on a feature of a to-be-developed mobile application. Therefore, different mobile applications may have different spatial arbitration conditions. For example, the arbitration condition may be that if the user is more than a threshold of 10 kilometers away from a previously recorded location, a subsequent operation is triggered. If a spatial information change does not exceed the foregoing threshold, the spatial information change is blocked, and no other related operation is triggered. A granularity level of the arbitration condition may be set by the mobile application developer based on the feature of the mobile application, and may be 10 kilometers or 100 meters, and a change interval may be one minute, one hour, or one week. Alternatively, the spatial information-based arbitration conditions may be related to several preset location areas. Whether the terminal is in one of the preset location areas is determined based on the obtained spatial information. If the terminal is in one of the preset location areas, a corresponding subsequent operation is performed. The preset location area is set by the mobile application developer during application development based on a development requirement for the mobile application, and there may be one or more preset location areas. The arbitration condition for the time information may be a preset time period, to determine whether a current time of the user is within the preset time period. For example, some specific operations or information push of the mobile application can be triggered only on a day off or a holiday. As another example, some mobile applications are not allowed to perform operations or push information at night. Therefore, when the user initiates an operation or the mobile application needs to push information to the user, whether the time is within the preset allowed time range needs to be determined.

The foregoing steps have been described in detail in the foregoing method embodiment. Detailed implementation of each step in the method embodiment is also applicable to this. Details are not described herein again.

The subsequent operation is performed based on a setting of the application developer. Therefore, subsequent operations of different mobile applications triggered after the spatial information change is arbitrated are different. The following operations may be triggered.

4a. Push the spatial information, that is, notify, after the spatial information change and a time information change meet a preset condition, the mobile application of the spatial information change status of the terminal corresponding to the mobile application.

4b. Trigger a continuous query, that is, manage, using the current spatial information (arbitrated) of the user as an input, a continuous query on a mobile device database or a cloud database by the mobile application, and return obtained data to the mobile terminal. The mobile application is allowed to set a trigger frequency or duration for the continuous query on the system. The mobile application stops the continuous query when the duration is reached or a quantity of continuous queries reaches an upper limit. This allows more flexible mobile application development. For example, when it is determined that the terminal is in a preset scenic spot, a current location of the terminal is obtained every 10 minutes within a specific period of time, and information about a scenic spot near the terminal is pushed to the user.

4c. Trigger permission management, that is, receive the current spatial information of the user, and determine, based on the current spatial information, whether the user has permission to access or operate data.

4d. Another operation, for example, an operation of directly triggering a mobile application to query and access data on the cloud or the terminal, and pushing information to the user based on a query result.

The cloud platform may further store, based on a design requirement of the platform, historical spatial information of the user in the database 503 on the cloud platform. To be more specific, the spatial information of the user obtained each time is stored as a historical record.

The foregoing steps have been described in detail in the foregoing method embodiment. Detailed implementation of each step in the method embodiment is also applicable to this. Details are not described herein again.

In this embodiment of the present disclosure, native support is provided for spatiotemporal data of the user, greatly reducing workload of the mobile application developer in processing and managing the spatiotemporal data. Advantages of a conventional spatiotemporal database and the device-cloud collaboration platform are combined to improve a current device-cloud collaboration platform on which native support of spatiotemporal data is absent. Processing and management of spatiotemporal data are integrated in a framework of the device-cloud collaboration platform. The mobile user developer only needs to invoke an API to implement the following operations: obtaining, at a proper frequency and in a proper manner, spatiotemporal information and an increment of the spatiotemporal information that are of the user and that interest the mobile application developer; accessing and analyzing historical spatiotemporal data of the user with permission of the user; registering a continuous query for a cloud database, where an update of the continuous query is triggered by a spatiotemporal data change of the user; and managing data based on the spatiotemporal information of the user. The normalized framework facilitates global optimization and intelligent optimization.

The following describes implementations and invocation manners that may be used in implementation processes of the foregoing embodiments of the present disclosure.

For obtaining spatial information and time information of a user, a spatial variable such as hwb_curloc and a public access function thereof are retained in a device-cloud collaboration platform, to store current location information. The platform keeps access and synchronization of the current location information of the system through a system location interface function. For example, the platform periodically invokes a current location of the user returned by a positioning module such as a GPS/Global System for Mobile Communications (GSM)/Wi-Fi module in a LocationListener class monitoring system, or a LocationManager class system and GPSTracker class system in an Android system. Alternatively, two variables (for example, hwb_curloc and hwb_curtime) and public access functions thereof are retained to store a current time and current location information respectively. The platform keeps access and synchronization of the current time and the current location information of the system through a system location and time interface function. For example, the platform periodically invokes a current location of the user returned by a positioning module such as a GPS/GSM/Wi-Fi module in a LocationListener class monitoring system, or a LocationManager class system and GPSTracker class system in an Android system. Alternatively, only one spatial location variable may be retained, and the time is obtained in another manner.

For a manner of storing and invoking historical spatial information of the user, on a premise that the user grants permission for the platform, if the platform can automatically synchronize and store the historical spatial information of the user on a cloud, and store spatial information and time information related to the spatial information in combination, mobile application development can be greatly simplified. For example, the current location information may be pushed to a cloud database for storage through automatic data synchronization of the device-cloud collaboration platform. This is an inherent feature of the device-cloud collaboration platform, and can ensure desirable performance and be transparent to the mobile application developer. Implementation methods vary in different examples of the cloud database and storage. For example, if a structured query language (SQL) is supported in communication from a mobile device to the cloud, spatial information of the mobile device may be simply written into the cloud database using an instruction of INSERT INTO HWB_CLOUD_USER1_TIME_SPACE(hwb_curtime, hwb_curloc) in a PQLIB. Because a storage capability of the cloud is almost infinite compared with that of the mobile device, a historical location and time information of the user may be well stored. If a mobile application needs to read and analyze data, the mobile application may simply use an instruction of SELECT*FROM HWB_CLOUD_USER1_TIME_SPACE WHERE . . . to extract data for query and analysis. The device-cloud collaboration platform may also implement a relatively complex analysis module or provide an analysis function through a user-defined function (UDF) interface as a predicate for invocation of the mobile application.

For arbitration of a spatial information change, the mobile application may set a parameter threshold through a platform interface to manage a spatial information policy of the mobile application in the module, or may control the spatial information policy of the mobile application in the module in another manner. The mobile application may choose to closely follow a real-time spatial information change of the system, or may not perform control at all, and an arbitration module determines the policy. For example, the mobile application developer may define a time (hwb_inttime_interval) threshold and a location change (hwb_intloc_interval) threshold that interest the application. The values (hwb_intloc_interval) and (hwb_inttime_interval) are specified by the mobile application. In addition, the platform keeps a private variable hwb_prevloc for the mobile application to record a previous location of the user. The arbitration module obtains the threshold and the previous location variable, and conforms to a policy selected by the application: When a distance between the current location hwb_curloc and the previous location hwb_prevloc exceeds the threshold, data synchronization is performed or the mobile application is notified. The foregoing arbitration of the spatial information change helps reduce unnecessary update and calculation workload, improve performance of the platform in supporting the mobile application, and greatly support performance and implementation of a continuous query and permission management.

For the continuous query, the spatial information change of the mobile application varies greatly with a characteristic of the application. Currently, most continuous spatial queries are specific to a particular case. For example, some continuous queries are mainly mobile queries for static objects (for example, Pokémon Go), some continuous queries are queries through an aggregate function (for example, a query on statistics on a quantity of nearby friends in a social application), and some continuous queries are k-NN type queries (for example, a query on a restaurant nearby). Although mobile applications have different requirements, a device-cloud collaboration data platform needs to support most common continuous queries related to the spatial data. A main difference between these continuous queries is sensitivity to the spatial data change. Therefore, in an implementation process, a spatial information change arbitration module enables the mobile application to set a spatial change interest threshold, and the like, to effectively control trigger of the continuous query, in order to support most common continuous queries related to the spatial information. In addition, the mobile application is allowed to set a continuous query trigger frequency on the platform. When a trigger time period arrives, the platform automatically triggers a query to provide more flexibility.

If the user does not set the interest threshold or trigger frequency for a continuous query, the platform may provide the following intelligent optimization: A most conservative update policy is used first. If a condition is updated, a query is performed again. Then, result sets of two queries are compared. If a difference between the result sets is quite small, a large continuous query trigger period is automatically set for the arbitration module. If a difference between the result sets becomes larger, a continuous query trigger period is shortened. This feedback manner dynamically balances accuracy of the continuous query and platform performance.

Other two problems that need to be resolved in the continuous query are scale scalability and high concurrency. A device-cloud platform may support thousands of clients, and many different applications may run on a same platform. To support unique scalability and high concurrency of the device-cloud platform, the platform in the present disclosure provides an extensible computing algorithm. Main methods are as follows: (1) Shared execution: Similar queries may be put together to share results; (2) Approximate query: If a deviation is allowed, an approximate query method may be used to provide a quick result that may be continuously improved until the user is satisfied.

For permission management, an implementation may be determined based on a used data storage format. However, a basic idea is as follows: At each node that stores data, for example, at all non-leaf nodes of a tree-like data structure (JavaScript Object Notation (JSON) or Extensible Markup Language (XML)), or at each tuple of a table-like structure, or another node, a permission record that includes permission information is placed. This permission record includes permission of each user for data. It should be emphasized that each piece of permission of each user is associated with a rule function/method, to define permission restriction calculation that is based on time information and spatial information. When a user needs to start an application or access data, the platform first queries a permission record of the user on the application or the data. If the permission record includes time constraints and spatial constraints, the platform obtains time information and spatial information of the current user for comparison based on an associated rule. Only after confirming that the user has permission, the application or the data is open to the user.

Figure 10:
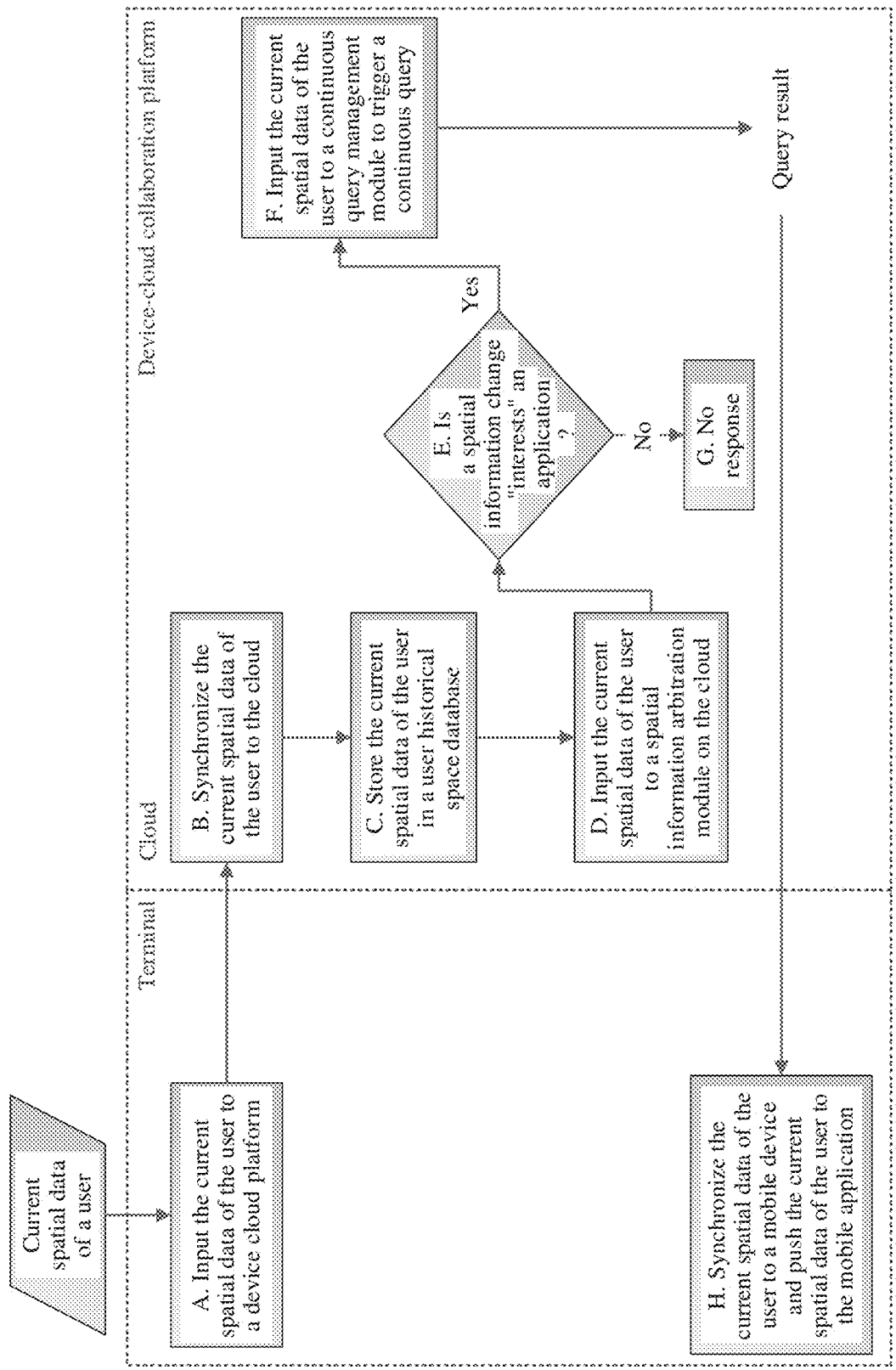
FIG. 10 is a flowchart of a method for implementing a "smart travel" application according to an embodiment of the present disclosure.

FIG. 10 is a flowchart of a method for implementing a "smart travel" application according to an embodiment of the present disclosure.

An application method of this embodiment of the present disclosure is described in detail using an application of "smart travel" as an example. This application needs to invoke massive scenic spot data stored on a cloud in real time. However, only a mobile device can accurately obtain current spatial information of a user. Therefore, close collaboration between the mobile device and the cloud is required for the spatial data. In addition, only when a spatial information change of the user exceeds 10 or even dozens of kilometers, a query of surrounding scenic spots needs to be performed again and the surrounding scenic spots are pushed to the user.

With reference to the characteristics of this application and the foregoing core method procedure, in an architecture of the device-cloud collaboration platform according to the embodiments of the present disclosure, a procedure of an implementation method of this application is as follows.

A. The device-cloud collaboration platform keeps close tracking of a spatial information change of a mobile device system and pulls real-time spatial information of the mobile device into the platform at a high frequency.

B. The device-cloud collaboration platform pulls the real-time spatial information to the cloud.

C. The user grants the platform permission to store historical spatial information of the user on the platform, and the platform stores spatial data in a database for the historical spatial data of the user on the cloud.

D. The latest current spatial data is also sent to a spatial information change arbitration module on the cloud. The mobile application has been set during deployment. Only when the user is more than a threshold of 10 kilometers away from a previous recorded location, a scenic spot database on the cloud is queried, and scenic spot information and photographing information are pushed.

E. The change arbitration module determines whether an increment between the current spatial data of the user and the previous recorded data meets a threshold condition. If the condition is not met, the procedure ends (G).

F. If the condition is met, the arbitration module sends the spatial information to a registered response module, for example, a continuous query module.

H. A continuous query is triggered. The continuous query module queries the scenic spot database on the cloud using the current spatial information as a condition predicate, and returns obtained data to the mobile device (after data processing and filtering by the cloud or the mobile device). Then the data is pushed to the user.

Figure 11:
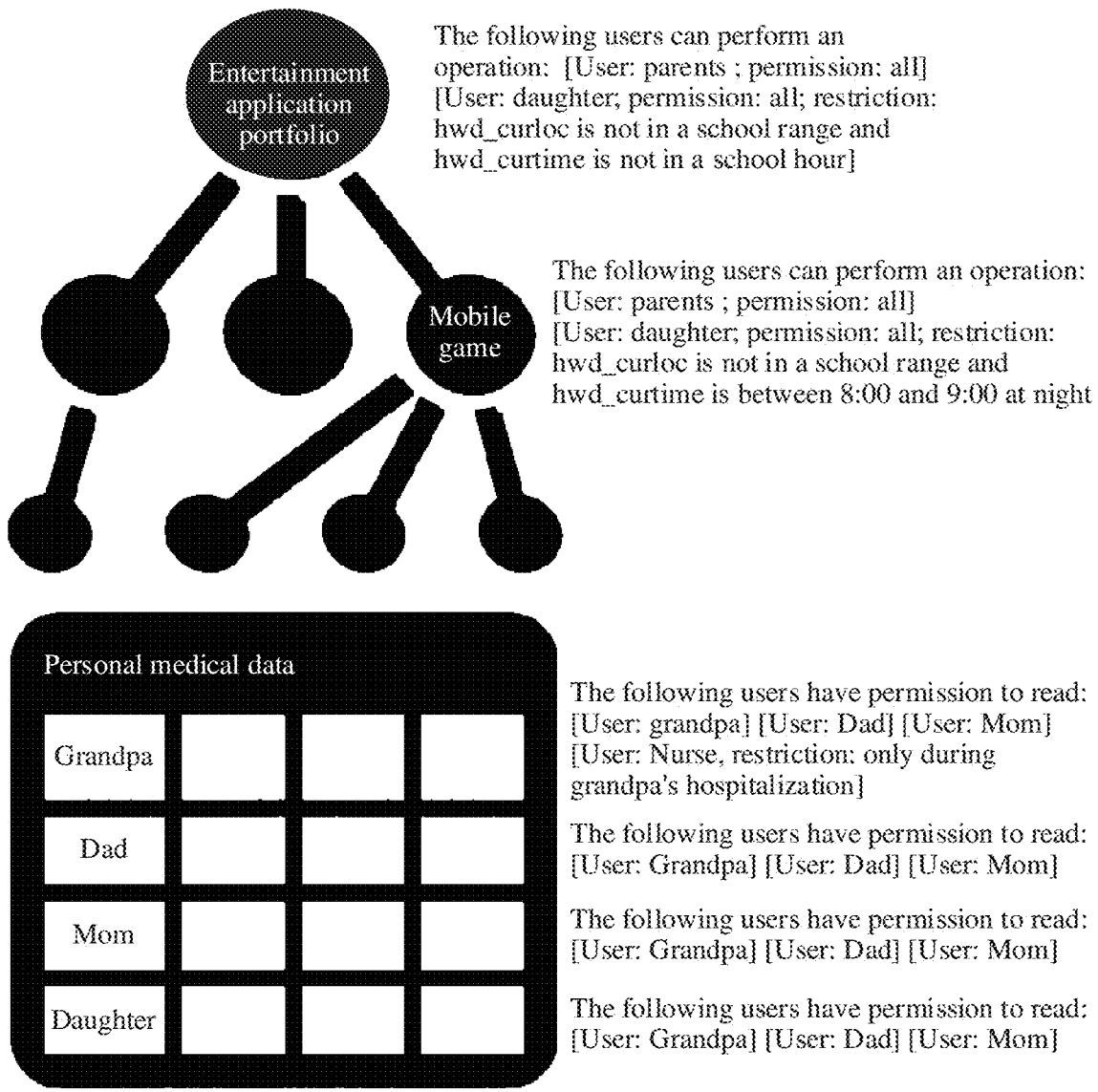
FIG. 11 is a diagram of an application scenario of a permission management module according to an embodiment of the present disclosure.

FIG. 11 shows an application scenario of a permission management module according to the present disclosure. As shown in FIG. 11, a tree-like structure in the figure represents an entertainment application on a mobile device, and a specific application in the entertainment application and application data of the specific application. Each node in the tree-like structure may be a folder, a file, or data in an Android system, or may be an application set, an application, and data in an iOS system. Squares in the figure represent relational graphical data, for example, personal medical data, between the mobile device and a cloud. The permission management module in this embodiment of the present disclosure sets, at the data node, permission that is related to spatial information and that is managed on a device-cloud collaboration platform, such that a mobile application can better perform refined management on user permission of data. For example, in FIG. 11, parents have full permission on all applications and data, such that the parents can determine a location of the daughter based on arbitration of a spatial information change, and restrict use of the daughter user of an entertainment and application portfolio at a specified time and specified place (e.g., during school hours and at school), to easily implement parent control. In addition, the parents can determine a location of the grandfather based on arbitration of a spatial information change, and restrict medical data of the grandfather to be open to a nurse only when the grandfather is in hospital and in a hospital area.

Further, a possible product implementation form in this embodiment of the present disclosure is a software module on the cloud and the mobile device on the popular device-cloud collaboration platform, namely, program code deployed on hardware of the mobile device or deployed on a hardware system of the cloud.

The architectural diagram of an application scenario shown in FIG. 1 is used as an example. The program code in this embodiment of the present disclosure exists in a mobile device database and a cloud database of platform software, and exists inside a device-cloud data collaboration module and outside an existing module of platform software. The program code in this embodiment of the present disclosure is run in a memory of the mobile device or a memory on the cloud platform.

In conclusion, the embodiments of the present disclosure resolve a problem in other approaches that: a device-cloud platform does not provide support in obtaining, storage, query, and management of spatial data of a user because the device-cloud platform ignores importance of the spatial information of the user, complexity of spatial information processing, and a characteristic of the spatial information of the user. In other words, according to the foregoing technical solutions in the embodiments of the present disclosure, the cloud platform obtains spatial information of a plurality of terminals connected to the platform, to natively support the spatial data of the user, and performs arbitration based on a spatial information change and spatial information-based arbitration conditions corresponding to different target mobile applications, to block a change in which the user is not interested, and trigger a subsequent operation related to a mobile application, in order to better meet a diversified requirement of the mobile application for the spatial information, and facilitate development of the mobile application.

In conclusion, the embodiments of the present disclosure resolve a problem in other approaches that: a device-cloud platform does not provide support in obtaining, storage, query, and management of spatial data of a user because the device-cloud platform ignores importance of the spatial information of the user, complexity of spatial information processing, and a characteristic of the spatial information of the user. In other words, according to the foregoing technical solutions in the embodiments of the present disclosure, the cloud platform obtains spatial information of a plurality of terminals connected to the platform, to natively support the spatial data of the user, and performs arbitration based on a spatial information change and spatial information-based arbitration conditions corresponding to different target mobile applications, to block a change in which the user is not interested, and trigger a subsequent operation related to a mobile application, in order to better meet a diversified requirement of the mobile application for the spatial information, and facilitate development of the mobile application.

For example, compared with other approaches, the embodiments of the present disclosure have the following beneficial effects.

1. The spatial data of the user is synchronized between a mobile device and a cloud, such that current location and time information of the user can be automatically stored, and a change of the current location and the time information of the user can be accurately tracked. In addition, historical location and time information of the user can be selectively stored, and can be accessed and referred at any time if permission is granted for the user.

2. Spatial information changes of the user are filtered, such that a spatial information change in which the user is not interested can be effectively blocked, and only a spatial change that interests an application is pushed. To be more specific, an interface can be provided for the application. A module on the platform is controlled, by defining a rule, setting a condition predicate, setting a change threshold, or defining control logic, to flexibly arbitrate the spatial information changes, in order to filter the spatial information changes, push only the information change that interests the application for subsequent processing, and block the spatial change in which the user is not interested. This effectively avoids frequent data operations or information push.

3. Through a continuous query and permission management, more flexible and diversified application development modes can be provided for mobile application development related to the spatial information. A continuous query and user permission verification that are based on the spatial information and the time information are supported: Variable real-time spatial information is used as an input to provide native support for a series of typical data operations, in order to better support a typical mobile application. For example, a cloud database is continuously searched and compared using the variable real-time spatial information as a predicate, to automatically and continuously push related information based on current spatial information of the user. Fine-granularity user permission is set for data based on the spatial information of the user, and whether the user has permission is determined based on the current spatial information. The foregoing functions are not restricted to be deployed on the cloud or on the mobile device. The functions may be deployed on both the mobile device and the cloud of the platform, or may be deployed selectively. The purpose is to provide plentiful modules that can be invoked for a mobile application developer to develop an application. In this way, the mobile application developer can more conveniently develop diversified mobile applications based on different requirements.

The architecture and components of the device-cloud collaboration platform in the present disclosure may constitute many different product structures and method procedures. The foregoing merely lists several typical core product structures and method procedures. It should be noted that the foregoing embodiments are merely intended for describing the technical solutions of the present disclosure, but not for limitation. Although the present disclosure is described in detail with reference to the foregoing embodiments, person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A device-cloud collaboration method, comprising:
   obtaining, by a cloud platform, spatial information of a plurality of target terminals communicatively connected to the cloud platform, wherein the spatial information includes first spatial information that indicates a location of a target terminal of the target terminals;
   tracking a spatial information change of each target terminal to obtain a spatial information change status of each target terminal by obtaining a spatial information change increment of each target terminal;
   determining, for each different target mobile application, whether the spatial information change increment is greater than or equal to a spatial information change threshold preset for the target mobile application; and
   instructing, based on determining, for each different target mobile application, whether the spatial information change increment is greater than or equal to the spatial information change threshold, at least one of the target terminals to trigger subsequent operations related to the different target mobile applications, wherein the different target mobile applications are installed on the target terminals, and wherein the different target mobile applications need to obtain corresponding spatial information of the target terminals.

2. The device-cloud collaboration method according to claim 1, wherein instructing the at least one of the target terminals to trigger subsequent operations comprises instructing the target terminal to trigger a subsequent operation related to a target mobile application when the spatial information change status of the target terminal meets one of spatial information-based arbitration conditions that is preset for the target mobile application, and wherein the target mobile application is installed on the target terminal.

3. The device-cloud collaboration method according to claim 1, wherein obtaining the spatial information change increment comprises comparing the spatial information with spatial information of each target terminal obtained in a previous preset time interval.

4. The device-cloud collaboration method according to claim 1, wherein tracking the spatial information change comprises tracking a current spatial information change of each target terminal to obtain a location area of each target terminal.

5. The device-cloud collaboration method according to claim 1, wherein instructing the at least one of the target terminals to trigger the subsequent operations comprises notifying a target mobile application of the spatial information change status of the target terminal, and wherein the target mobile application is installed on the target terminal.

6. The device-cloud collaboration method according to claim 1, wherein instructing the at least one of the target terminals to trigger the subsequent operations comprises:
   using the first spatial information of the target terminal as a variable query condition;
   triggering, when a query condition change meets a preset condition, a query for related information of the target mobile application; and
   pushing a query result to the target terminal corresponding to the target mobile application.

7. The device-cloud collaboration method according to claim 1, wherein instructing the at least one of the target terminals to trigger the subsequent operations comprises determining, based on preset data access permission, whether to allow the target terminal to perform an operation on or to access data for which the preset data access permission is granted.

8. The device-cloud collaboration method according to claim 3, wherein the spatial information change increment is a distance between a first location corresponding to the spatial information and a second location corresponding to the spatial information obtained in the previous preset time interval.

9. The device-cloud collaboration method according to claim 4, further comprising:
   determining, for each different target mobile application, whether the spatial information change status of the target terminal meets one of spatial information-based arbitration conditions that is preset for the target mobile application; and
   determining, for each different target mobile application, whether the location area of the target terminal is a location area preset for the target mobile application.

10. A terminal, comprising:
   a spatial information obtaining processor configured to obtain spatial information of the terminal, wherein the spatial information indicates a location of the terminal, and wherein a target mobile application that is installed on the terminal needs to obtain the spatial information;
   a spatial information change tracker configured to track the spatial information to obtain a spatial information change status of the terminal by obtaining a spatial information change increment of the terminal; and
   a spatial information change arbitrator configured to:

determine, for each different target mobile application, whether the spatial information change increment is greater than or equal to a spatial information change threshold preset for the target mobile application; and instruct, based on determining, for each different target mobile application, whether the spatial information change increment is greater than or equal to the spatial information change threshold, the terminal to trigger subsequent operations related to the different target mobile applications.

11. The terminal according to claim 10, wherein the spatial information change arbitrator is configured to trigger a subsequent operation related to the target mobile application when the spatial information change status meets one of spatial information-based arbitration conditions that is preset for the target mobile application.

12. The terminal according to claim 10, wherein the spatial information change tracker is configured to obtain the spatial information change increment by comparing the spatial information with previous spatial information of the terminal obtained in a previous preset time interval.

13. The terminal according to claim 10, wherein the spatial information change tracker is configured to track a current spatial information change of the terminal to obtain a location area of the terminal.

14. The terminal according to claim 10, further comprising a push processor, wherein the spatial information change arbitrator is configured to determine, based on spatial information-based arbitration conditions and the spatial information change status, whether to trigger the push processor, and wherein the push processor is configured such that after being triggered by the spatial information change arbitrator, the push processor notifies the target mobile application of the spatial information change status of the terminal.

15. The terminal according to claim 10, further comprising a permission management module, wherein the spatial information change arbitrator is configured to determine, based on spatial information-based arbitration conditions and the spatial information change status, whether to trigger the permission manager.

16. The terminal according to claim 10, wherein the spatial information change increment is a distance between a first location corresponding to the spatial information and a second location corresponding to the spatial information obtained in a previous preset time interval.

17. The terminal according to claim 13, wherein the spatial information change arbitrator is configured to determine, for each different target mobile application, whether the location area of the terminal is a location area preset for the target mobile application.

18. The terminal according to claim 15, wherein the permission manager is configured such that after being triggered by the spatial information change arbitrator, the permission manager determines, based on preset data access permission, whether to allow the terminal to perform an operation on or to access data for which the preset data access permission is granted.

19. A cloud platform, comprising:
a non-transitory readable storage medium configured to store a program; and
a processor coupled to the non-transitory readable storage medium and configured to execute the program to:
obtain spatial information of a plurality of target terminals communicatively connected to the cloud platform, wherein the spatial information includes first spatial information that indicates a location of a target terminal of the target terminals;
track a spatial information change of each target terminal to obtain a spatial information change status of each target terminal by obtaining a spatial information change increment of each target terminal;
determine, for each different target mobile application, whether the spatial information change increment is greater than or equal to a spatial information change threshold preset for the target mobile application; and
instruct, based on determining, for each different target mobile application, whether the spatial information change increment is greater than or equal to the spatial information change threshold, at least one of the target terminals to trigger subsequent operations related to the different target mobile applications, wherein the different target mobile applications are installed on the target terminals, and wherein the different target mobile applications need to obtain corresponding spatial information of the target terminals.

20. The cloud platform according to claim 19, wherein the processor triggers the subsequent operations related to the different target mobile applications when the spatial information change status of the target terminal meets one of spatial information-based arbitration conditions that is preset for the target mobile application.

* * * * *